United States Patent
Fuchs et al.

(10) Patent No.: US 7,297,290 B2
(45) Date of Patent: Nov. 20, 2007

(54) NANOSTRUCTURED MAGNETORHEOLOGICAL FLUIDS AND GELS

(75) Inventors: Alan Fuchs, Reno, NV (US); Faramarz Gordaninejad, Reno, NV (US); Hatice Gecol, Reno, NV (US); Ben Hu, Reno, NV (US); Beril Kavlicoglu, Reno, NV (US)

(73) Assignee: The Board of Regents of the University and Community College System of Nevada, Reno, NV (US)

( * ) Notice: Subject to any disclaimer, the term of this patent is extended or adjusted under 35 U.S.C. 154(b) by 281 days.

(21) Appl. No.: 10/915,257

(22) Filed: Aug. 9, 2004

(65) Prior Publication Data

US 2005/0109976 A1 May 26, 2005

Related U.S. Application Data

(60) Provisional application No. 60/493,520, filed on Aug. 8, 2003.

(51) Int. Cl.
H01F 1/44 (2006.01)

(52) U.S. Cl. .................. 252/62.54; 252/62.52

(58) Field of Classification Search ............. 252/62.52, 252/62.54
See application file for complete search history.

(56) References Cited

U.S. PATENT DOCUMENTS

| | | | |
|---|---|---|---|
| 5,106,691 A | 4/1992 | Harwell et al. | |
| 5,298,179 A | 3/1994 | Ukita et al. | |
| 5,505,880 A | 4/1996 | Kormann et al. | |
| 5,549,837 A | 8/1996 | Ginder et al. | |
| 5,578,238 A | 11/1996 | Weiss et al. | |
| 5,645,752 A | 7/1997 | Weiss | |
| 5,667,715 A | 9/1997 | Foister | |
| 5,670,077 A | 9/1997 | Carlson et al. | |
| 5,985,168 A | 11/1999 | Phule | |
| 5,989,447 A | 11/1999 | Podszun et al. | |
| 6,527,972 B1 | 3/2003 | Fuchs et al. | |
| 2005/0011710 A1* | 1/2005 | Hitchcock et al. | 188/267.2 |
| 2005/0116194 A1 | 6/2005 | Fuchs et al. | |

FOREIGN PATENT DOCUMENTS

| | | |
|---|---|---|
| JP | 05-25316 | 2/1993 |
| JP | 10-296074 | 11/1998 |
| WO | WO 94/10693 | 5/1994 |
| WO | WO 97/02580 | * 1/1997 |

OTHER PUBLICATIONS

Ashour, O. et al. (Mar. 1996), "Manetorheological Fluids: Materials Characterization and Devices," *J. Int. Mat. Sys. Struct.* 7:123-130.

(Continued)

*Primary Examiner*—C. Melissa Koslow
(74) *Attorney, Agent, or Firm*—Greenlee, Winner and Sullivan, P.C.

(57) ABSTRACT

Magnetorheological materials having a supramolecular polymer gel as a component of the carrier are disclosed. Useful supramolecular polymers for gels include those having terpyridine ligands which can participate in metal coordination bonding. The magnetizable particles of magnetorheological materials can have supramolecular surfactant-polymer coatings.

28 Claims, 7 Drawing Sheets

OTHER PUBLICATIONS

Bates et al. (1990) "Block Copolymer Thermodynamics: Theory and experiment," *Annu. Rev. Phys. Chem.* 41:525-555.

Botempo et al. (Sep. 2002) "Atom Transfer Radical Polymerization as a Tool for Surface Functionalization," *Adv. Mater.* 14(17):1239-1241.

Calzia et al. (Jun. 2002) "Methacrylate Polymers Containing Metal Binding Ligands for Use in Supramolecular Materials: Random Copolymers Containing Terpyridines," *Macromol.* 35:6090-6093.

Carty et al. (1999) "Soft Condensed Matter-Fundamentals and Applications," *Symposium HH 1* Apr. 5-7, 1999.

Chujo et al. (1993) "Cobalt(III) Bipyridyl-Branched Polyoxazoline Complex as a Thermally and Redox Reversible Hydrogel," *Macromol.* 26:6320-6323.

Chujo et al. (1993) "Iron(II) Bipyridyl-Branched Polyoxazoline Complex as a Thermally Reversible Hydrogel," *Macromol.* 26:6315-6319.

Davis et al. (1996) "Organization of Methoxysilane Molecules on Iron," *Int. J. Adhesion and Adhesives* 16:5-15.

DeCaro, D. (1996) "Synthesis, Characterization and Magnetic Studies of Nonagglomerated Zerovalent Iron Particles. Unexpected Size Dependence of the Structure," *Chem. Mater.* 8:1987-1991.

Ejaz et al. (1998) "Controlled Graft Polymerization of Methyl Methacrylate on Silicon Substrate by the Combined Use of the Langmuir-Blodgett and Atom Transfer Radical Polymerization Techniques," *Macromol.* 31:5934-5936.

Esumi, Kunio (2001) "Interactions Between Surfactants and Particles: Dispersion, Surface Modification, and Adsolubilization," *J. Colloid and Interface Sci.* 241:1-17.

Esumi et al. (1991) "Polymerization of Styrene Adsolubilized in Polmerizable Surfactant Bilayer on Alumina," *Langmuir* 7:1775-1778.

Faul et al. (May 2003) "Ionic Self-Assembly: Facile Synthesis of Supramolecular Materials," *Advanced Materials* 15:673-683.

Fuchs et al. (Apr. 2004) "Development and Characterization of Hydrocarbon Polyol Polyurethane and Silicone Magnetorheological Polymeric Gels," *J. Appl. Poly. Sci.* 92:1176-1182.

Gale, P.A. (Aug. 2002) "Anion-anion Assembly: a New Class of Anionic Supramolecular Polymer Containing 3,4-Dichloro-2,5-Diamido-Substituted Pyrrole Anion Dime," *J. Am. Chem. Soc.* 124:1128-11229.

Giesen et al. (May 2004) "On the Interaction of Coagulation and Coalescence During Gas-Phase Synthesis of FE-Naonoparticle Agglomerates," *Chem. Eng. Sci.* 59:2201-2211.

Ginder, J.M. (1996) "Rheology Controlled by Magnetic Fields," *Encyclopedia of Applied Physics* 16:487-503.

Ginder, J.M. et al. (1996), "Rheology of Magnetorheological Fluids: Models and Measurements," *Intern. J. Mod. Phys. B.*, 10(23,24):3293-3303.

Gupta R.K. (1977) "Solid-in-Liquid Suspensions," In; *Polymer and Composite Rheology*, pp. 224-265.

Horst et al. (2000) "Stable Critical Gels of a Copolymer of Ethane and 1-Butene Achieved by Partial Melting and Recrystallization," *Macromol.* 33:7538-7543.

Huang et al. (2001) "Controlled Synthesis of Cross-Linked Ultrathin Polymer Films by Using Surface Initiated Atom Transfer Radical Polymerization," *Angew. Chem. Int. Ed.* 40(8):1510-1512.

Huang et al. (1999) "Fluorensence Study on Intermolecular Complex Formation Between Mesogenic Terphenyldiimide Moieties of a Thermotropic Liquid-Crystalline Polymide," *Polymer* 40:3821-3828.

Ikkala et al. (1999) "Self-Organized Liquid Phase and Co-Crystallization of Rod-Like Polymers Hydrogen-Binded to Amphiphilic Molecules," *Advanced Materials* 11:1206-1210.

Ikkala et al. (Mar. 2002) "Functional Materials Based on Self-Assembly of Polymeric Supramolecules," *Science* 295:2407-2409.

Kaneko et al. (1997) "Reversible Crystal Deformation Observed in the Main-Chain Type of Liquid Crystalline Polymide," *Macromol.* 30:4224-4246.

Kataby et al. (1997), "Self-Assembled Monolayer Coatings on Amorphous Iron and Iron Oxide Nanoparticles: Thermal Stability and Chemical Reactivity Studies," *Langmuir* 13:6151-6158.

Kataby et al., (1998), "The Absorption of Monolayer Coatings on Iron Nanoparticles: Mossbauer Spectroscopy and Xanes Results," *Thin Solid Films* 333:41-49.

Kataby et al., (1999), "Coating Carboxylic Acids on Amorphous Iron Nanoparticles," *Langmuir* 15:1703-1708.

Kataby et al. (1997) "Coating of Amorphous Iron Nanoparticles by Long-Chain Alcohols," *Langmuir* 14:1512-1515.

Katabi et al (1996) "Self-Assembled Monolayer Coatings of Iron Nanoparticles with Thiol Derivatives," *J. Cryst. Growth* 166:760.

Keller et al. (1996) "Oxidation Protection of Magnetic Iron Particles by Ultrathin Layers of Silanes," *J. Mag and Magnet. Matls,.* 155:101-103.

Kim et al. (2000) "Surface-Initiated Ring-Opening Metathesis Polymerization on $Si/SiO_2$," *Macromol.* 33:2793-2795.

Knapila et al. (Jul. 2004) "Influence of Molecular Weight on Self-Organization, Uniaxial Alignment, and Surface Morphology of Hairy-Rodlike Polyfluorene in Thin Films," *J. Phys. Chem B* 108:10711-10720.

Kormann et al. (1995), "MR Fluids with Nano-sized Magnetic Particles," Proceedings of the $5^{th}$ International Conference on Electrorheological Fluids, Magnetorheological Suspensions and Associated Technology, World Scientific, Publisher, pp. 362-367.

Kosonen et al. (2000) "Nanoscale Conducting Cylinders Based on Self-Organization of Hydrogen-Binded Polyaniline Supramolecules," *Macromol.* 33:8671-8675.

Kricheldorf et al. (1995) "Liquid Crystalline Polyimides: 18. Thermotropic Polyimides Based on Biphenyl-3,3',4,4'-tetracarboxylic Anhydride," *Polymer* 36:1893-1902.

Lehn, Jean-Marie (Mar. 2002) "Toward Self-Organization and Complex Matter," *Science* 295:2400-2403.

Marutani et al. (Mar. 2004) "Surface-Initiated Atom Transfer Radical Polymerization of Methyl Methacrylate on Magnetic Nanoparticles," *Polymer* 45:2231-2235.

Masaharu et al. (1996) "New Macromolecular Silane Coupling Agents Synthesized by Living Anionic Polymerization; Grafting of these Polymers onto Inorganic Particles and Metals," *Progr. Organic Coating* 27:277-285.

Maynard et al. (2001) "Synthesis of Nanophase-Segragated Poly(vinyl acetate)-Poly(dimethylsiloxane) and Poly(vinyl acetate)-Poly(styrene) Graft Copolymers," *Polymers* 42:7576-7574.

Meguro et al. (1986) "Polymerization of Styrene Adolubilized in Surfactant Adsorbed Bilayer Pigments," *Bull. Chem. Soc. Jpn.* 59:3019.

Ming, M. (Jan. 2003) "Preparation and Characterization of Magnetite Nanoparticles Coated by Amino Silane," *Colloid and Surfaces A: Physiochem. Eng. Aspects* 212:219-226.

Moore et al. (1999) "Supramolecular Polymers," *Current Opin. Colloid Inter. Sci.* 4:108-116.

Nilsson, S. et al., (2000), "Novel Organized Structures in Mixtures of a Hydrophobically Modified Polymer and Two Oppositely Charged Surfactants," *Langmuir* 16:6825-6832.

Nozawa, K. et al., (1997), "Chemical Modification of Alkanethiol Monolayers for Protecting Iron Against Corrosion," *Corrosion Science* 39(9):1625-1639.

Phule, P.P. (Aug. 1998), "Synthesis of Novel Magnetorheological Fluids," *MRS Bulletin*, 23-25.

Pourcain et al. (1995) "Thermoreversible Supramolecular Networks with Polymeric Properties," *Macromol.* 28:4116-4121.

Prozorov, T. et al., (1999), "Effect of Surfactant Concentration on the Size of Coated Ferromagnetic Nanoparticles," *Thin Solid Films* 340:189-193.

Pyun et al. (2001) "Synthesis of Nanocomposite Organic/Inorganic Hybrid Materials Using Controlled/"Living"Radical Polymerization," *Chem. Mater.* 13:3436-3448.

Ramachandran, S. et al., (1996), "Self-assembled Monolayer Mechanism for Corrosion Inhibition of Iron by Imidazolines," *Langmuir* 12:6419-6428.

Rienhoudt et al. (Mar. 2002) "Synthesis Beyond the Molecule," *Science* 295:2403-2407.

Ruokolainen et al. (1999) "Supramolecular Polymeric Materials with Hierarchial *Structure-Within-Structure* Morphologies," *Advanced Materials* 11:777-778.

Ruokolainen et al. (1998) "Switching Supramolecular Polymeric Materials with Multiple Length Scales," *Science* 280:557-560.

Schlotter, N.E. et al., (1986), "Formation and Structure of a Spontaneously Adsorbed Monolayer of Arachidic on Silver," *Chem. Phys. Lett.* 132(1):93-98.

Schubert, U.S. (2001) "Functionalized Oligomers and Copolymers with Metal Complexing Segments: A Simple and High Yield Entry Towards 2,2':6'2" -Terpyridine Monofunctionalized Telechelics," *Macromol. Symp.* 163:177-187.

Schubert, U.S. (2000) "Functionalized Polymers with Metal Complexing Segments: A Simple and High-Yield Entry Towards 2,2':6'2" -terpyridine Based Oligomers," *Macromol. Rapid Communications* 21:1156-1161.

Shen et al. (1999) "Aqueous Magnetic Fluids Stabilized by Surfactant Bilayers," *J. Mag. and Mag. Mat.* 194:37-44.

Shen et al. (1999) "Bilayer Surfactant Stabilized Fluids: Synthesis and Interactions at Interfaces," *Langmuir* 15:447-453.

Shen et al. (2000) "Polymerization of Olefin-Terminated Surfactant Bilayers on Magnetic Fluid Nanoparticles," *Langmuir* 16:9907-9911.

Sung et al. (2001) "Photo-Induced Liquid Crystal Alignment on Polymide Containing Fluorine Group," *Synthetic Metals* 117:277-279.

Valkama et al. (Jun. 2003) "Multicomb Polymeric Supramolecules and Their Self-Organization: Combination of Coordination and Ionic Interactions," *Macromol. Rapid Communications* 24:556-560.

Watson et al. (1999) "Hybrid Nanoparticles with Block Copolymer Shell Structures," *J. Am. Chem. Soc.* 121:462-463.

Wilson et al. (Jun. 2002) "Development and Characterization of Magnetorheological Polymer Gels," *J. Appl. Poly. Sci.* 84:2733-2742.

Wolpers, M. et al., (1991), "Surface Analytical Investigation of Metal Surfaces Modified by Langmuir-blodgett Films of Silanes," *App. Surf. Sci.* 47:49-62.

Wolpers, M. et al. (1990), "SEM and Sam Imaging of Silane Lb Films on Metallic Substrates," *App. Surf. Sci.* 45:167-170.

Wu et al., (1987) "Two-Dimensional Reaction Solvents: Surfactant Bilayers in the Formation of Ultrathin Films," *Langmuir* 3:531-537.

Wu et al., (1987) "Two-Dimensional Solvents: Kinetics of Styrene Polymerization in Admicelles at or Near Saturation," *J. Phys. Chem.* 91:623-634.

Xu (Oct. 2002) "Intermolecular Interaction in Multicomponent Supramolecular Complexes Through Hydrogen-Binding Association," *Macromol.* 35:8846-8851.

Yeh et al. (1996) "Nanoscale Supramolecular Structures in the Gels of Poly(Diallyldimethylammonium Chloride) Interacting with Sodium Docecyl Sulfate," *J. Am. Chem. Soc.* 118:6615-6618.

Yilgor et al. (2000) "Comparison of Hydrogen Binding in Polydimethylsiloxane and Polyether Based Urethane and Urea Copolymers," *Polymer* 41(3):849-857.

Yu, H-Z et al., (2000), "Molecular Orientation and Electrochemical Stability of Azobenzene Self-assembled Monolayers on Gold: an In-situ FTIR Study," *Langmuir* 16:6948-6954.

Al-Hussein et al. (Nov. 2003) "Melt Morphology of Polystyrene-Poly(ethylene oxide) Metallo-Supramolecular Diblock Copolymer," *Macromol.* 36:9281-9284.

Aramaki et al. (Nov. 2003) "Miscibility of Block Copolymers and Surfactants in Lamellar Liquid Crystals," *Macromol.* 36:9443-9450.

\* cited by examiner

NANOSTRUCTURED MAGNETORHEOLOGICAL FLUIDS AND GELS

CROSS-REFERENCE TO RELATED APPLICATIONS

This application claims the benefit of U.S. Provisional Application Ser. No. 60/493,520, filed Aug. 8, 2003, which is hereby incorporated by reference to the extent not inconsistent with the disclosure herein.

ACKNOWLEDGEMENT OF GOVERNMENT SUPPORT

This invention was made, at least in part, with government support from the Army Research Office, under grant number DAAD 19-01-1-0614. The United States government may have certain rights in this invention.

BACKGROUND OF THE INVENTION

This invention is in the field of magnetorheological materials, in particular magnetorheological materials comprising a supramolecular polymer gel and/or magnetizable particles coated with a supramolecular layer.

Magnetorheological materials are typically comprised of magnetizable particles suspended in a carrier material. A magnetorheological material exhibits rapid and reversible changes that are controllable by an applied magnetic field. The shear stress and viscosity of such a material is related to whether the material is in the presence of a magnetic field, termed the on-state, or the absence of a magnetic field, termed the off-state. In the on-state, the magnetizable particles align with the magnetic field and increase the shear yield stress and viscosity of the material over its off-state value.

Typical state-of-the-art magnetorheological (MR) fluids are multiphase materials consisting of magnetizable particles suspended in a liquid carrier fluid. These MR fluids exhibit properties typical of a viscoelastic material. In addition to the magnetizable particles, the carrier fluid serves as a continuous insulating material. Some of the carrier fluids typically utilized are silicone, hydrocarbon, and synthetic oils. An additional component that is often present in MR fluids is a stabilizer, which serves to keep the particles suspended in the fluid. MR fluids demonstrate non-Newtonian fluid behavior when exposed to a magnetic field.

Magnetorheological materials containing chemically cross-linked gels have been reported. U.S. Pat. No. 6,527,972, to Fuchs et al. discloses magnetorheological polymeric gels (MRPGs) comprising magnetic particles and a carrier material comprising a partially covalently-crosslinked polymeric gel.

Magnetorheological materials containing materials with some non-covalent bonding or cross-linking have also been reported. U.S. Pat. No. 5,645,752, to Weiss et al. reports hydrogen-bonding thixotropic agents including silicone oligomers, organic oligomers, and organo-silicon oligomers. WO 97/02580 to Zrinyi et al. reports magnetic field sensitive gels wherein the gels comprise a polymer cross-linked by physical and/or chemical means. JP410296074A to Zuriini et al. reports polymer substances with a cross-linking structure and a magnetic colloidal particle dispersed in the cross-linking structure, where the polymer substances include agar and gelatin.

Ginder et al. (U.S. Pat. No. 5,549,837) and Foister (U.S. Pat. No. 5,667,715) report MR fluids with magnetic particles of more than one size range in a carrier fluid. Ginder et al. disclose a MR fluid composition comprising a magnetizable carrier fluid and a multiplicity of magnetizable particles loaded within the magnetizable carrier fluid. The magnetizable carrier fluid can be a ferrofluid. Foister discloses a MR fluid employing a mixture of a first component of relatively large particles and a second component of relatively small particles, dispersed in a liquid vehicle.

Coating of iron and/or iron oxide particles with monolayers of long chain thiols or imidazolines is reported by Kataby et al. (G. Kataby et al., Langmuir, (1997), 13, 6161-6158; G. Kataby et al., (1998), Thin Solid Films, 333, 41-49). Self-assembled coatings of iron nanoparticles by carboxylic acids and long-chain alcohols have also been reported (G. Kataby et al., "Coating carboxylic acids on amorphous iron nanoparticles," (1999) Langmuir, 15, 1703-1708; G. Kataby et al., (1997)—Langmuir 14, 1512 (1998).

Use of surfactant bilayers for stabilization of magnetic fluids was reported by Shen et al. (Shen, L. et al., (1999), Langmuir, 15, 447-453). Polymerization of olefin-terminated surfactant bilayers on magnetic fluid nanoparticles has also been reported (Shen, L. et al., 2000, Langmuir, 16, 9907-0011). U.S. Pat. No. 6,527,927, to Fuchs et al. discloses magnetorheological materials comprising magnetic particles coated with surfactant bilayers and a carrier material comprising a polymeric gel.

U.S. Pat. No. 5,106,691 to Harwell et al. reports a method for producing polymeric films from a surfactant template. Experiments were reported for sodium dodecyl sulfate as surfactant, styrene (with ethanol) as monomer and alumina powder as substrate. Polymerization of monomers adsolubilized within bilayers formed on particles is reported by Megure et al. and Wu et al. (Megure, et al (1986), Bull. Chem. Soc. Jpn. 59, 3019; Wu et al., (1987), Langmuir, 3, 531, Wu et al., (1987), J. Phys. Chem. 91, 623).

U.S. Pat. No. 6,527,927, to Fuchs et al. discloses magnetorheological materials comprising magnetic particles coated with monolayers, self-assembling monolayers, bilayers or multiple layers of a polymeric gel. U.S. Pat. No. 5,985,168 describes the use of a bridging polymer to modify the surface of the iron particles. This approach is reported to lead to improved stability and redispersibility. In this patent three thermoset polymers are described: polyvinylpyrollidone, polyethyleneamine and poly(4-vinlypyridine). Organic polymers have also been reported as coatings for iron particles, as described in U.S. Pat. No. 5,989,447. This patent describes many families of polymers which are used and exhibit reduced abrasiveness and produce high stability with regard to settling. The use of polyelectrolytes to coat magnetic particles is described in U.S. Pat. No. 5,508,880.

Kormann et al. (Kormann, Cl., Laun, H. M., and Richter, H. J., "MR Fluids with Nano-sized Magnetic Particles", Proceedings of the 5$^{th}$ International Conference on Electrorheological Fluids, Magnetorheological Suspensions and Associated Technology, World Scientific, Publisher, pp. 362-367, Jul. 10-14, 1995) have synthesized and characterized MR fluids containing nanosized magnetic particles. Because of the presence of the nanoparticles, these fluids exhibited very low shear stress.

Several hydrogen bonded supramolecular polymer systems have been reported. Hydrogen bonding of polystyrene-b-poly(4vinylpyridine) has been reported with nonadecylphenol (NDP) (J. Ruokolainen et al., Advanced Materials (1999), 11, 777-78) and pentadecylphenol (PDP) (J. Ruokolainen et al., Science (1998), 280, 557-560). Ikkala and coworkers (J. Ruokolainen et al., Advanced Materials (1999), 11, 777-78) reported supramolecular polymers forming hierarchical morphologies like lamellar-within lamellar, lamellar-within-cylindrical, cylindrical-within-lamellar, spherical-within-lamellar, and lamellar-within-spherical. A comb copolymer supramolecular system was reported to be formed by either Poly4VP(NDP)$_{1.0}$ or Poly4VP(PDP)$_{1.0}$ complex (J. Ruokolainen et al., Science (1998), 280, 557-560). Hydrogen bonding of polyaniline with 4-hexylresorcinol (Hres) has been reported (H. Kosonen, et al., Macromolecules (2000), 33, 8671-8675). Hydrogen-bonding of poly(2,5-pyridinediyl) with alkylphenols has been reported (Ikkala O., et al. Advanced. Materials (1999) 11, 1206-1210). Hydrogen bonding of diacid bipyridal ethylene has been reported (Jianwei Xu, Macromolecules (2002),35, 8846-8851). Pourcain and his coworker used the hydrogen bond between carboxylic acid and pyridines to self assemble an extended chain (C. B. St. Pourcain; A. C. Griffin; (1995), Macromolecules, 28, 4116-4121).

Several supramolecular systems involving electrostatic interactions have been reported. Supramolecular systems based on electrostatic interactions between poly(styrenesulfonate) and n-alkyltrimethylammonium surfactants have been reported (Charl F. J. Faul and Markus Antonietti Advanced Materials (2003), 15, 673-683). Cohesive coatings with low surface tensions were reportedly formed through electrostatic interactions of polyelectrolyte and diverse fluorinated surfactant complex (Faul and Antionietti, 2003 supra). Supramolecular interactions between poly(diallyldimethylammonium chloride) (PDADMACI) and sodium dodecyl sulfate have also been reported (Fengji Yeh, et al., J. Am. Chem. Soc., (1996), 118, 6615-6618).

Several supramolecular systems involving hydrophobic/hydrophilic interaction have been reported. Nanophase-segregated graft copolymers of poly(vinyl acetate) (PVAc) backbones branched with poly(dimethylsiloxane) (PDMS) or poly(styrene) (PS) have been reported (Heather D. Maynard et al., Polymer 42 (2001) 7567-7574). Supramolecular behavior of block copolymers (AB diblock or AGA, ABC triblock) has been reported (Frank S. Bates, Glenn H. Fredickson, Annu. Rev. Phys. Chem. (1990) 41 525-55). In the phase diagram of poly(oxyethylene)alkyl ether and poly(oxyethylene)-poly(dimethylsiloxane) diblock copolymers, two lamellar phases were reported to coexist, one containing surfactant rich thin bilayers and the other copolymer-rich thick bilayers (Aramaki, Md. et al. Macromolecules 36 (2003) 9443-9450). Block copolymers dissolved in block-selective solvents also self-assemble into a variety of morphologies including spheres, cylinders, and vesicles.

Several supramolecular systems involving metal coordination bonding have been reported. Terpyridine-terminated polystyrene-block-poly(ethylene oxide) coordinated with transition metal chlorides (i.e. ruthenium ions) have been reported (M. Al-Hussein et al. Macromolecules (2003), 36, 9281-9284). Poly(4-vinylpyridine) coordinated with 2,6-bis(octylaminomethyl)-pyridine and Zn(dodecylbenzenesulfonate) Zn(DBS)$_2$ has been reported (Sami Valkama, et al. Macromolecular Rapid Communications (2003) 24 556-560) Systems based on 2,2':6',2''-terpyridine based polymer have also been reported (Ulich S. Schubert, Macrolol. Symp. (2001), 163 177-187; Ulrich S. Schubert, Macromol. Rapid Commun. (2000), 21, 1156-1161).

Systems based on liquid crystal interactions and π-π stacking have also been reported. A poly(9,9 bis(ethylhexyl)-fluorene-2,7-diyl) system has been reported (Matti Knaapila et al., J. Phys. Chem. B (2004), 108, 10711-10720). Polyimide systems have also been reported (Hans R. Kricheldorf and Volker Linzer, (1995), Polymer Vol. 9, 1893-1902; T. I Kaneko et al.,", Macromolecules (1997), 30, 4224-4246; H. W. Huanga, et al. (1999), Polymer 40, 3821 C3828; S.-J. Sung, et al., Synthetic Metals 117 (2001) 277-279).

A polymer containing 3,4-dichloro-2,5-diamido-substituted pyrrole anion dimer forming a supramolecular system via anion-anion assembly has also been reported (Philip A. Gale "Anion-anion assembly: A new class of anionic supramolecular polymer containing 3,4-dichloro-2,5-diamido-substituted pyrrole anion dime" J. Am. Chem. Soc. (2002), 124, 11228-11229).

Supramolecular polymer gel systems have been reported. Chujo et al. report syntheses of metal induced gelation of polyoxazolines containing bipyridyl units. .(Chujo, Y.; Sada, K.; Safgusa, T. Macromolecules (1993), 26, 6320-6323; Chujo, Y.; Sada, K.; Safgusa, T. Macromolecules (1993), 26, 6315-631). Yeh et al. report nanoscale supramolecular structures in the gels of poly(diallyldimethylammonium chloride) interacting with sodium dodecyl sulfate (F. Yeh, et al. J. Am. Chem. Soc. (1996) 118 6615-6618).

Shear yield stress and off-state viscosity are important design parameters for MR materials utilized in MR devices that are used for vibration control such as in dampers, shock absorbers, clutches and engine mounts. A material with high shear yield stress permits the development of high torque output devices. High yield stress also permits the development of micromechanical devices. The present invention describes a class of MR materials with high shear yield stress, controllable off-state viscosity and fluid stability. The viscoelastic properties of this material can be designed through control of their storage and loss moduli.

SUMMARY OF THE INVENTION

Nanostructured magnetorheological (nano-MR) materials comprising magnetizable nanoparticles and/or supramolecular assemblies of polymers are a new class of materials which can have high shear yield stress, controllable passive-off (i.e., no magnetic field applied) viscosity and fluid stability. They can also have controllable storage and loss moduli. Another important property of MR fluids is the ability to remix or redisperse the magnetizable particles. Nano MRPG materials can have excellent remixing or redispersion properties. If the nano-MR materials comprise coated particles, they can also provide protection from in-use thickening (IUT) by protecting the surface of the particles from abrasive fracture.

Supramolecular polymers are expected to have advantages over covalent polymers because of their tunable and reversible characteristics. Moore and coworkers suggested that supramolecular polymers might quickly adjust their topology in response to external mechanical forces. (Moore, J. S., Current opinion in Colloid & Interface Science 1999, 4:108-116) Therefore, in the supramolecular magnetorheological polymer gel, the non-covalent bond is believed to reversibly break when applying external shear stress and re-unite after removal of the stress. This reversibility is expected to improve the durability of the material, increase its lifetime and improve the response of the fluid to the external shear stress.

In an embodiment, the invention provides magnetorheological materials comprising a carrier material comprising a carrier fluid and a supramolecular polymer or polymer gel; and magnetizable particles. In an embodiment, the carrier fluid comprises a supramolecular polymer gel which comprises crosslinks formed by metal-coordination, hydrophobic-hydrophilic interactions, π-π stacking, donor-acceptor interactions, and van der Waals forces. In an embodiment, the supramolecular polymer gel is not hydrogen bonded. In an embodiment, the supramolecular polymer gel contains metal-ligand bonds.

In another embodiment, the invention provides a magnetorheological fluid comprising: a carrier material comprising a carrier fluid and a supramolecular polymer gel, a first group of magnetizable particles having a first range of diameter sizes between about 5 and about 500 nm, and a second group of magnetizable particles having a second range of diameter sizes between about 3 and about 75 microns.

In another embodiment, the invention provides a magnetorheological fluid comprising a carrier fluid and magnetizable particles, wherein the magnetizable particles are coated with a supramolecular polymer or a supramolecular surfactant-polymer assembly. These supramolecular coatings can improve the dispersion characteristics and lubricity of the magnetizable particles as well as protecting the particle surface against corrosion and abrasive fracture. The use of self assembled monolayers (SAM's) or bilayers for modification of the particle surface can provide further enhancement of shear yield stress, reduced particle settling, viscosity control, and control of the viscoelastic properties—storage and loss moduli.

In the materials of the invention, the yield stress and fluid stability are enhanced by the interaction between the supramolecular polymeric gel containing noncovalent bonds, carrier fluid and particle surfaces. The storage and loss moduli are controlled in this way as well.

DETAILED DESCRIPTION OF THE INVENTION

Figure 1:
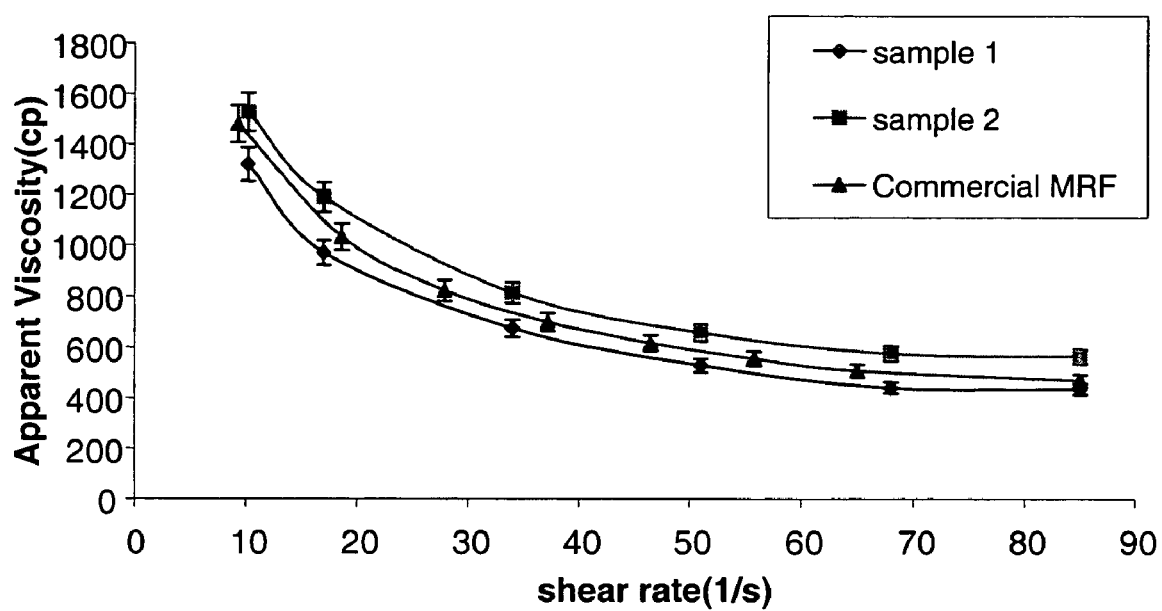
FIG. 1 shows off-state apparent viscosity as a function of shear rate at room temperature for two magnetorheological materials containing supramolecular polymer gel, and a commercial magnetorheological fluid.

In general the terms and phrases used herein have their art-recognized meaning, which can be found by reference to standard texts, journal references and contexts known to those skilled in the art. The following definitions are provided to clarify their specific use in the context of the invention.

Nanostructured magnetorheological polymer fluids and gels contain either magnetizable nanoparticles and/or a nanostructured polymer structure. The polymers can form nanostructures through supramolecular interactions which occur on the nanometer scale. The supramolecular polymer structure can occur in the carrier fluid and/or on the surface of the magnetizable particles.

The nano-MR fluids and gels of the present invention can be formulated to yield a wide range of viscosities. Their viscosity is controlled by the amount of nano- and micron-sized particles and the amount and type of polymeric gel selected. The viscosity of nano-MR fluids and gels typically ranges from about 200 to about 4000 cp at high shear stress. Lower and higher viscosities are also attainable. The use of a nanostructured MR polymer gel can allow control of the shear thinning behavior of the material. Shear thinning behavior is indicated by a decrease in viscosity or shear stress with either shear rate or time. Nano MRPG materials can decrease more rapidly to the final viscosity or shear stress than traditional MR fluids.

The apparent viscosity is defined as the slope of shear stress/shear rate curve. An important feature of SMPG's is that the off-state viscosity can be controlled by the concentration of supramolecular polymer in the solvent. The viscosity is expected to increase with the amount of supramolecular polymer in the solvent.

The term "supramolecule" refers to a collection of atoms held together by covalent and noncovalent bonds (Rienhoudt, D. N. and Crego-Calama, M., "Synthesis Beyond the Molecule", Science, Volume 295, (2002), pp 2403-2407). Supramolecular polymers can be defined as polymeric arrays of monomeric or polymeric units that are self-assembled by reversible and highly directional secondary interactions, which include hydrogen bonds, metal bonds, π-π stacking, donor-acceptor associations, electrostatic interactions, hydrophilic-hydrophobic interactions and van der Waals forces, resulting in polymeric properties in dilute and concentrated solutions, as well as in the bulk.

In general, stronger interactions are preferred for use in the invention. In an embodiment, the intermolecular binding interaction is not a van der Waals interaction due to its relatively low interaction strength (on the order of 2 kJ/mol). Intermolecular binding interactions with directional forces enhance the interaction between neighboring molecules, which results in high performance polymeric materials, especially in terms of mechanical properties. In hydrogen bonding systems, it is known that polar environments will compete with the desired hydrogen bond and eliminate its association. Therefore, hydrogen bonding of the supramolecular system is not desirable when the carrier fluid is a highly polar organic solvent. In an embodiment, the supramolecular system is not hydrogen bonded.

Table 1 lists a number of polymers which can participate in supramolecular interactions. When no complexing agent is listed, the polymer is capable of supramolecular interaction with itself. When a complexing agent is listed, the polymer is capable of supramolecular interaction with the complexing agent. Complexing agents listed are exemplary. The following polymers may be used as supramolecular polymers: silicone, polyurethane, polystyrene-block-poly-4-vinylpyridine; polybenzoxazole, polybenzimidazole, uridopyrimidone bifunctionalized siloxane and polyaniline, Polystyrene-b-poly(4 vinylpyridine), Polyaniline, Poly(2,5-pyridinediyl), Poly(styrenesulfonate, Poly (diallyldimethylammonium chloride) (PDADMACl), Poly (NIPAAm-co-methylacrylamido propyl trimethyl ammonium chloride (MAPTAC)) mixed with poly (NIPAAm-co-sodium methacrylate (NaMA)), Graft copolymers of poly(vinyl acetate) (PVAc) backbones branched with poly(dimethylsiloxane) (PDMS) or poly(styrene) (PS), Block copolymers (AB diblock or ABA, ABC triblock), Poly(NIPAAm-co-n-octadecylacrylamide), Terpyridine-terminated polystyrene-block-poly(ethylene oxide), Poly(4-vinylpyridine), Polyfluorenes: i.e: Poly(9,9 bis(ethylhexyl), polyimide—liquid crystal, 2,2':6',2"-terpyridine based polymer, Diacid bipyridyl ethylene, Polymer containing 3,4-dichloro-2,5-diamido-substituted pyrrole anion dimer.

embodiment, the supramolecular polymers of the invention are formed by non-covalent bonding on the side chain of the polymeric units.

As used herein, a "supramolecular polymer gel" is a polymer gel which is at least in part noncovalently-crosslinked. The noncovalent crosslinks can be formed between polymeric units. For example, in gels formed by metal-coordination bonding, the crosslink can be formed by association of metal ligand-containing polymeric units with a metal ion. In gels formed by electrostatic interaction, the

TABLE 1

| Polymer | Supramolecular Interaction | Complexed with |
|---|---|---|
| Polystyrene-b-poly(4 vinylpyridine) | Hydrogen Bond | Oligomeric amphiphile: i.e: nonadecylphenol (NDP), pentadecylphenol (PDP) |
| Polyaniline[ ] | Hydrogen Bond | Oligomeric amphiphile: i.e: 4-hexylresorcinol (Hres) |
| Poly(2,5-pyridinediyl)[ ] | Hydrogen Bond | Alkylphenols: i.e: octyl gallate (octyl 3,4,5-Trihydroxybenzoate) |
| Poly(styrenesulfonate)[ ] | Electrostatic Interaction | N-alkyltrimethylammonium surfactants |
| Poly(diallyldimethylammonium chloride) (PDADMACl)[ ] | Electrostatic Interaction | Anionic surfactant: Sodium dodecyl sulfate (SDS) |
| Poly(NIPAAm-co-MAPTAC) mixed with poly(NIPAAm-co-NaMA) | Electrostatic Interaction | — |
| Graft copolymers of poly(vinyl acetate) (PVAc) backbones branched with poly(dimethylsiloxane) (PDMS) or poly(styrene) (PS)[ ] | Hydrophobic/Hydrophilic Interaction | — |
| Block copolymers (AB diblock or ABA, ABC triblock)[ ] | Hydrophobic/Hydrophilic Interaction | — |
| Poly(NIPAAm-co-n-octadecylacrylamide) | Hydrophobic/Hydrophilic Interaction | Surfactant: i.e: cetylpyridinium chloride (CPC) or sodium dodecyl sulfate (SDS) |
| Terpyridine-terminated polystyrene-block-poly(ethylene oxide)[ ] | Metal Coordination Bond | Transition metal chloride: i.e: ruthenium ions |
| Poly(4-vinylpyridine)[ ] | Metal Coordination Bond | 2,6-bis(octylaminomethyl)-pyridine and Zn(dodecylbenzenesulfonate) Zn(DBS)$_2$ |
| Polyfluorenes: i.e: Poly(9,9 bis(ethylhexyl)-fluorene-2,7-diyl)[ ] | Π—Π Stacking | — |
| Polyimide 2,2':6',2"-terpyridine based polymer | Liquid crystal Metal coordination | |
| Diacid bipyridyl ethylene | Hydrogen bond | |
| Polymer containing 3,4-dichloro-2,5-diamido-substituted pyrrole anion dimer | Anion-anion assembly | |

There are two general approaches to synthesize these supramolecular polymers. (C. B. St. Pourcain; A. C. Griffin; 1995, Macromolecules, 28,4116-4121) In the first, non-covalent bonding occurs on the side chain of a polymer, thereby, forming a crosslinked supramolecular system introducing new properties into the polymer system. In the second approach, the supramolecular polymer is formed from small molecules or oligomers between which non-covalent bonds, such as hydrogen bonds form as part of the main chain. However, in the second approach, the material behavior is more like a small molecule than a polymer. In an crosslink can be formed by electrostatic interaction between anionic and cationic polymeric units. Polymer gels include free radical polymerized polymers which are gelled by solvation in a suitable solvent. In addition, polymer gels include crosslinked free radical polymer gels (e.g. crosslinked poly(NIPAAm)). Polymer gels can also include crosslinked and uncrosslinked step polymers.

Supramolecular polymer gels useful for the invention include, but are not limited to, supramolecular structures which are at least in part: hydrogen bonded, hydrophobic/hydrophilic bonded, van der Waals bonded, metal coordination bonded, liquid crystal polymers, and/or other noncovalently bonded systems.

Among the previously mentioned secondary interactions, metal-ligand bonds exhibit both strong and directional interactions where the selection of metal ion and ligand dictate association. (Kevin J, C.; Gregory N, T. Macromolecules (2002), 35, 6090-6093) The reversible nature of the metal-ligand interaction was demonstrated by Chujo and his coworkers. (Chujo, Y.; Sada, K.; Safgusa, T. Macromolecules (1993), 26, 6320-6323; Chujo, Y.; Sada, K.; Safgusa, T. Macromolecules 1993, 26, 6315-631) Chujo et al. did syntheses of metal induced gelation of polyoxazolines containing bipyridyl units. Based on the observation of the solid precipitate after metal ion addition, they assumed supramolecular network formation. When diluted in solvent, the solid swells and then dissolves.

Polymeric units useful for metal coordination bonded gels include those containing metal ligands such as bipyridyl units or terpyridine units. In an embodiment, the supramolecular polymer gel comprises bypyridal or terpyridine polymeric units which coordinate with a metal ion. In an embodiment, the polymer contains multiple metal ligands. In an embodiment, the polymer unit is a Zn coordinated terpyridine polymer unit containing multiple metal ligands per chain. Terpyridine ligands are useful because of the outstanding complexing abilities of these units. Even in polar solvents, the coordination formed by metal—ligand bonds still exists. (Kevin J, C.; Gregory N, T. Macromolecules (2002), 35, 6090-6093).

In another embodiment, the supramolecular polymer gel comprises a slightly crosslinked anionic copolymer network which electrostatically interacts with a slightly crosslinked cationic copolymer network. In an embodiment, the anionic copolymer network is poly(N-isopropylacrylamide) (poly (NIPAAm) copolymerized with an anionic monomer and the cationic copolymer network is poly(NIPAAM) copolymerized with a cationic monomer. the poly(NIPAAm) which is a supramolecular polymer bonded electrostatically. The anionic and cationic (NIPAAm) based polymers can also be made in linear form. Polymeric units useful for electrostatically bonded gels include poly (NIPAAm).

In another embodiment, the supramolecular polymer gel comprises PS-4VP polymers hydrogen bonded to oligomeric amphiphiles.

Polymer gels useful for the present invention can also include gels similar to the magnetorheological polymer gels (MRPG's) disclosed in U.S. Pat. No. 6,527,972. However, some or all of the covalent cross-links in the MRPGs are replaced by noncovalent cross-links including hydrophobic/hydrophilic interactions, van der Waals bonds, metal coordination bonds, hydrogen bonds, electrostatic interactions and other noncovalent bonds.

In the present invention, supramolecular polymers and polymer gels form nanostuctured supramolecular assemblies which can be used for modification of the carrier fluids, for surface modification of the magnetizable particles and combinations thereof. Self assembly methods are often associated with supramolecular structures. Some of the non-covalent bonding which is related to self assembly includes bonding due to hydrophobic/hydrophilic forces, H-bonding, bonding due to Van der Waals forces, electrostatic bonding, $\pi$-$\pi$ stacking and metal coordination bonding.

The nano-MRPGs of the present invention can be formulated to yield a wide range of viscosities. Their viscosity is controlled by the amount of nano- and micron-sized particles and the amount and type of polymeric gel selected. The viscosity of nano-MRPGs typically ranges from about 200 to about 4000 cp at high shear stress. Lower and higher viscosities are also attainable.

In one embodiment, the invention provides a magnetorheological material comprising a) a carrier material comprising a carrier fluid and a supramolecular polymer or polymer gel and, b) magnetizable particles. In an embodiment, the carrier fluid comprises a supramolecular polymer gel. The carrier material may form a continuous gel phase in which the carrier fluid is incorporated into the supramolecular polymer gel. Alternatively, the carrier may not form a continuous gel phase. In this case some of the carrier fluid is incorporated into the supramolecular polymer gel and some of the carrier fluid is not incorporated, leading to a heterogeneous material.

The carrier fluid is a liquid and is selected to be compatible with the supramolecular polymer or polymer gel and the magnetizable particles. Preferably, the carrier fluid is non-corrosive and nonreactive with the magnetizable particles. In general, noncorrosive carrier fluids are nonacidic. Carrier fluids useful in the present invention include, but are not limited to hydrocarbon carrier fluids such as: polyalphaolefin (PAO), silicone oil (SO), tri(propylene glycol)butyl ether, dioctylphthalate (DOP), propylene glycol (PG), and N-dodecyl-2-pyrrolidone. Chemical and physical properties of some carrier fluids useful in the present invention are illustrated in Table 2.

In an embodiment, the supramolecular polymer gel is formed in the presence of the carrier fluid. The supramolecular polymer gel is formed by polymerization of one or more monomers. In another embodiment, the supramolecular polymer gel is formed in the presence of a first fluid different than the carrier fluid then the first fluid is substantially replaced with the carrier fluid. The first fluid may be substantially replaced by the carrier fluid by adding the carrier fluid to the first fluid and the supramolecular gel, then removing the first fluid by any means known to those skilled in the art, including evaporation.

The magnetorheological materials of the invention may comprise a combination of nano and micron sized magnetizable particles. As used herein, a magnetizable particle is a particle that has either been magnetized (e.g. ferrite) or is capable of being magnetized (e.g. iron particles) by application of a magnetic field. As used herein, nanoparticles have a diameter between about 5 and about 500 nm and micron-sized particles have a diameter between about 1 and about 75 microns. In an embodiment, MR materials of the invention comprise a first group of magnetizable particles having a first range of diameter sizes between about 5 and about 500 nm, and a second group of magnetizable particles having a second range of diameter sizes between about 1 and about 75 microns. Preferably, the second range of diameter sizes is between about 3 and about 10 microns. In another embodiment, the magnetizable particles are between about 10 and about 200 nm.

The magnetizable particles are chosen based on their iron purity, size and shape. The nanoparticles can be pure iron, magnetite or iron/cobalt-based or other iron alloy nanoparticles. The micron sized iron particles can be in the reduced form of iron pentacarbonyl with a purity between about 97 to about 99.5 wt. %. Table 3 lists iron particles suitable for use in nano-MR material formulations. However, the magnetizable particles can be any magnetizable particles known to the art. The particle component of the magnetorheological material of the invention can consist essentially of any solid which is known to exhibit magnetorheological activity, e.g., made of compounds which exhibit paramagnetic, superparamagnetic or ferromagnetic activity. Such particles may be made of iron, iron oxide, iron nitride, iron carbide, carbonyl iron, chromium dioxide, low carbon steel, silicon steel, nickel, cobalt, and mixtures thereof. Iron oxide includes all known pure iron oxides, such as ferric and ferrous oxides, e.g., ferrites and magnetites. The magnetizable particles can be comprised of alloys of iron, such as those containing aluminum, silicon, cobalt, nickel, vanadium, molybdenum, chromium, tungsten, manganese and/or copper. Typically, the magnetizable particles are in the form of metal powders prepared by processes well known to those skilled in the art.

Typical methods for the preparation of metal powders include the reduction of metal oxides, grinding or attrition, electrolytic deposition, metal carbonyl decomposition, rapid solidification, or smelt processing. Methods for synthesizing iron nanoparticles have been described in the art. Giesen and coworkers (Giesen, B. et al. (2004), Chem. Eng. Sci., 59, 2201-2211) synthesized iron nanoparticles from iron pentacarbonyl, $Fe(CO_5)$, based on homogenous reaction in a wall heated aerosol reactor. The reaction is in gas phase producing a supersaturated iron vapor. The flow reactor is heated up to high temperatures, i.e. the wall temperature of the reactor is between 400-800° C. leading to decomposition of the iron pentacarbonyl. Particle size analysis and morphology of the iron nanoparticles were examined by means of transmission electron microscopy (TEM) and the average size of iron particles was found in the range of 10-100 nm depending on the process conditions (Giesen, et al. 2004). Chaudret and co-workers (de Caro, D., (1996), Chem. Mater. 8, 1987-1991) also investigated nonagglomerated zero valent iron particle synthesis based on sonolysis of $Fe(CO)_5$ in anisol in the presence of poly(dimethylphenyleneoxide) (PPO). Sonication of $Fe(CO)_5$ with PPO lead to decomposition of $Fe(CO)_5$. The particles size was about 30 nm.

Pure iron particles can be protected from oxidation by means of coating techniques. It is useful to deposit a thin, chemically bonded layer on the iron surface, such as a silane layer (Davis, S. J. and Watts, J. F., (1996), Int. J. Adhesion and Adhesives 16, 5-15). Davis and Watts used 3-glycidoxypropyltri-methoxsilane (GPS) as a silane to coat pure iron particles (Davis and Watts, 1996). Thin silane layer deposition is achieved by immersing the iron particles in silane solution for two minutes. Another silane is described in the work represented by Keller and co-workers (Keller, H. et al. (1996), J. Magnetism and Magnet. Matls., 155, 101-103). Chemisorption of silanes are achieved by hydrogen bonding of silanols which are formed by hydrolization of Si—Cl, Si—OR, and Si—$NR_2$ in aqueous medium. Both trimethoxysilane and tetramethoxysilane with long alkyl chains was used to deposit on iron particles to build up thin protection layer (Keller et al., 1996).

Various metal powders that are commercially available include iron powders, reduced iron powders, insulated reduced iron powders, and cobalt powders. Magnetizable particles with high saturation magnetization, such as iron/cobalt alloys are preferable for this application. These iron alloys are selected to provide high yield stress.

Magnetite or iron/cobalt-based nano-particles from about 5 to about 500 nm can be used to prepare a ferrofluid which can serve as a starting point for preparation of nano-MRPGs. Chemical precipitation may also be used to prepare the magnetite or cobalt based ferrofluids. The starting ferrofluid can also be a commercial ferrofluid. These ferrofluids may contain surfactants and other additives to stabilize the ferrofluid. Surfactants can also be used in the carrier material for viscosity modification.

When MR material comprises both nanoparticles and micron-sized particles, the magnetizable nano-particles can be added to the carrier fluid in an amount from about 0.1 to about 20 wt. % of the nano-MR material. Micron sized iron particles can be added to a ferrofluid to prepare a suspension having nano and micro-sized particles. The micron-sized particles are added to the carrier fluid in an amount from about 10 to about 90 wt. % of the nano-MR material. The combination of nano and micron sized particles provides significantly higher shear yield stress than either alone, increased stability to settling and increased passive-off viscosities. Under the influence of a magnetic field these nano- and micron sized particles contribute to the non-Newtonian behavior of the material. The fluid in which the magnetizable particles are synthesized and/or the fluid used to prepare the particle suspension can be different than the fluid used as a carrier fluid for the magnetorheological material.

When the MR materials comprise nanoparticles, but no microparticles, the magnetizable nanoparticles can be added to the carrier fluid in an amount from about 10 to about 90 wt % of the nano-MR material. When MR materials comprise micron-sized particles, but no nanoparticles, the magnetizabe micron-sized particles can be added to the carrier fluid in an amount from about 10 to about 90 wt % of the MR material.

In an embodiment, the invention provides for surface modification of the magnetizable particles. The magnetizable particles may be coated with a polymer by methods known to the art. Methods for coating particles with a polymer include physical adsorption, silanization, surface atom transfer radical polymerization, self assembled monolayers, surface ring opening metathesis polymerization, and dry coating. Dry coating methods are methods applied to dry particles and include use of fluidized beds, vibrating beds or free-fall gravity tubes. Physical adsorption of polymer chains onto magnetizable particles is described by Fuchs et al. and Wilson et al. (Fuchs, A. et al., J. Appl. Polymer Sci., (2002), 92, 1176-1182; Wilson, M. J. et al. (2002), J. Appl. Polymer Sci., 84, 2733-2742). Use of macromolecular silane coupling agents as inorganic particle treatment agents is reported by Masaharu and Ohata (Masaharu, Y. and Ohata, M., (1996), Progr. Organic Coating, 27, 277-285), Ming et al. investigated magnetite nanoparticles coated by amino silane (Ming, M., 2003, Colloid and Surfaces A: Physiochem. Eng. Aspects 212, 219-226). Surface-initiated atom transfer radical polymerization of methyl methacrylate on magnetite nanoparticles has been reported by Marutani et al. (Marutani, E., et al., (2004), Polymer, 45, 2231-2235). Self assembled monolayers on magnetizable particles have been reported by Kataby et al. (G. Kataby et al., (1996), J. Cryst. Growth, 166, 760)) Surface Ring Opening Methathesis Polymerization has been used to create a polymer coating on gold particles (Watson, K. et al., (1999), J. Am. Chem. Soc, 121, 462-463).

Atom transfer radical polymerization (ATRP) has the following features: the polymerization can be performed at very mild conditions (room temperature), with high yield and on a broad range of monomers. The occurrence of transfer reactions (in solution) is negligible, because the radical species are always present at the end of the growing, surface tethered polymer chains. (D. Bontempo, et al., Adv. Mater. (2002), 14, No. 17 September 3, 1239-1241) In this polymerization, radicals are generated by the redox reaction of alkyl halides with transition-metal complexes. Radicals can then propagate but are rapidly deactivated by the oxidized form of the transition-metal catalyst. Initiators typically used are α-haloesters (e.g., ethyl 2-bromoisobutyrate and methyl 2-bromopropionate) or benzyl halide (e.g., 1-phenylethyl bromide and benzyl bromide). A wide range of transition-metal complexes such as Ru-, Cu- and Fe-based system have been successfully applied to ATRP. For Cu-based systems, ligands such as 2,2'-bipyridine and aliphatic amines have been employed to tune both solubility and activity of various ATRP catalysts. ATRP has been successfully applied for the controlled polymerization of styrene, methacrylate, methacrylamides, acrylonitrile and 4-vinylpyridine. (J Pyun, et al., Chem. Mater. (2001), 13, 3436-3448) Muhammad developed the graft polymerization of methyl methacrylate (MMA) by ATPR on an initiator-immobilized substrate. 2-(4-chlorosufonyphenyl)ethyl trimethoxysilane was used as an initiator which can be immobilized on oxidized silicon particles. (M. Ejaz, et al., Macromolecules (1998), 31, 5934-5936) A cross-linked ultrathin polymer film coating on the gold was synthesized, using ATRP, by Wenxi et al. They immobilized the disulfide initiator onto the gold surface followed by surface grafting polymerization by the ATRP approach. Crosslinking is provided by multifunctional ethylene glycol dimethacrylate (W. Huang, et al., Angew, Chem. Int. Ed. (2001), 40 No. 8, 1510-1512).

Ring opening metathesis polymerization (ROMP) catalyzed by well-defined metal-alkylidines has proven to be an efficient method to control polymer molecular structure, size, and bulk properties. Ruthenium-based ROMP initiators have been shown to polymerize a large variety of monomers in a living fashion in a number of solvents, ranging from benzene to water. With these advances in catalyst design, ROMP is capable of overcoming the obstacles, such as side reactions and impurities on a surface, for surface polymerization. Namyong et al developed a method for growing thin polymer films from the surface of a silicon substrate by ring-open metathesis polymerization. (Namyong Y. Kim, et al. Macromolecules (2000),33, 2793-2795) There is a three step procedure. First, there is formation of a self-assembled monolayer (SAM) on silicon that incorporates norbornenyl groups. Second, there is attachment of a ruthenium catalyst to the surface using the norbornenyl groups. And third, the polymerization of added monomer to generate the film. This reaction offers ease of use and control over the thickness and chemical composition of deposited film. Keyth et al. took advantage of the functional-group-tolerant ruthenium carbene catalysts. They immobilized the initiator to the surface of gold nanoparticles and carried out the living polymerization on the surface of the particles. The advantages of this strategy are numerous including: control over polymer length and chemical composition as well as particles size, solubility and shape (K. J. Watson, et al. J. Am. Chem. Soc. (1999), 121, 462-463).

The particles may also be coated with graphite or ceramic coatings. Graphite coatings may be applied using any suitable method known to the art, including by in-situ graphitization of polymeric precursors. Ceramic coatings include sol-gel and silicon-based ceramics and may be applied using any suitable method known to the art.

In an embodiment, the surface of the magnetizable particles is modified by forming a supramolecular polymer coating on the particle. In an embodiment, the supramolecular polymer coating is comprised of polymeric units which interact with one another. In another embodiment, the supramolecular interaction may be due to interaction of a polymer with a complexing agent such as an oligomeric amphiphile, an alkylphenol, or a surfactant.

Supramolecular polymer coated particles may be made by any method known to the art, including physical adsorption, atom radical transfer polymerization, ring opening metathesis polymerization, and dry coating. Atom radical transfer polymerization, ring opening metathesis polymerization, and dry coating methods provide specificity to the particle surface. For MR materials comprising supramolecular polymer coated particles and corner materials comprising a supramolecular polymer or polymer gel, these three methods permit independent control of the polymer in the carrier material vs. the surface. This can provide improved control over issues including magnetorheological fluid or gel rheology, settling and remixing. In addition, the choice of coating method can allow control of the coating morphology. For example, atom radical transfer polymerization coatings are capable of producing coatings which are more like polymer molecules attached to the surface of the molecule, hanging into the carrier fluid, than a complete layer.

In another embodiment, the surface of the magnetizable particles is modified by forming surfactant-polymer coatings. In this embodiment, surfactant monolayers or bilayers are formed on the surface of the magnetizable particles. The particles can have a bi-modal particle distribution or can be particles of uniform size. Polymer monomers can then undergo hydrophobic/hydrophilic interaction with the surfactant and can solubilize in these surfactant monolayers or bilayers. Polymerization of the monomers can form supramolecular surfactant-polymer coatings. The polymer monomers adsolubilized into the surfactant monolayer or bilayer may be co-monomers and the film formed a copolymer. The polymer monomers may be polymerized by any means known to the art. While in some instances, polymerization of monomer molecules may occur spontaneously, in most cases it will be necessary to initiate polymerization such as by using heat, light, or chemical initiators. In an embodiment, a chemical initiator is combined with heat to polymerize the monomer. Suitable chemical initiators are known to those skilled in the art. In an embodiment, the chemical initiator is selected from the group consisting of azobisio-butyronitrile or persulfate. A supramolecular structure involving a surfactant monolayer can be formed by polymerizing within the surfactant bilayer and washing away the outer layer of surfactant. This procedure leaves only polymer coated on top of the surfactant monolayer.

In an embodiment, a self-assembled surfactant bilayer on a magnetite surface is used to absorb monomer molecules into the bilayer. In an aqueous solution, tail to tail assembly of surfactant molecules with the hydrophilic heads of the second layer of surfactant extending toward the aqueous solution forms the bilayer structure. In this embodiment, hydrophobic monomers will diffuse into the bilayer. It is expected that the more hydrophobic the monomer, the higher the monomer concentration will be in the bilayer and the lower the monomer concentration will be in the solution. The solubility of the monomer (or monomers) within the bilayer may be enhanced by introducing a co-solvent. In an embodiment, the concentration of the surfactant in solution is kept less than the critical micelle concentration to prevent micelle emulsion polymerization within the solution. Once the monomer molecules have diffused into the bilayer, the monomer molecules are polymerized to produce a film. In an embodiment, the concentration of monomer in the aqueous solution controlled so that appreciable polymerization of monomer in the bulk of the solution (outside the bilayer) does not occur.

Supramolecular surfactant-polymer coatings can be formed on magnetizable particles in a polar or nonpolar solvent. In an embodiment, the supramolecular surfactant-polymer coating is a supramolecular surfactant polymer gel. As used herein, a "supramolelcular surfactant-polymer gel" is a supramolecule comprising a surfactant and a polymer which is at least in part noncovalently bonded. Polar solvents useful for the present invention include water. The solvent in which the supramolecular surfactant-polymer coating is formed may be the same or different than the carrier fluid or material used in the magnetorheological material.

Surfactants useful in surface modification of the magnetizable particles can have either nonionic or ionic head groups. The surfactant is chosen depending in part on the magnetizable particle surface charge and the nature of the solvent. If the magnetizable particle surface charge at high pH (alkaline medium) is negative, cationic surfactant is preferred to maximize the number of surfactant molecules adsorbed on the solid surface. A surfactant bilayer can also be formed with an anionic surfactant, such as sodium dodecyl sulfate (SDS), in a polar solvent by adjusting the pH level of the solution. Surfactant tail groups can be either lipophilic or fluorophilic. Surfactant molecules can have either single or twin tails and either single or twin heads. Surfactants useful for the present invention include, but are not limited to: alkyl sulfates, alkyl mercaptans, amide carboxylates, alkylbenzenesulfanates, and methacrylate esters. Through selection of the bilayer surfactants, the properties of the polymer formed at the magnetizable particle surface can be controlled. For example, the solubility of the monomers in the bilayer varies depending on the specific surfactant and monomers chosen.

The redispersion properties of these magnetizable fluids can be further improved by addition of a second amphiphile after formation of a polymer coating on the magnetizable particle. The second amphiphile, such as 3-n pentadecylphenol (PDP), can be hydrogen bonded to the polymer layer, such as the P4VP block of a P4VP layer. In this way a supramolecular polymer coating can be constructed. Such hydrogen bonded supramolecules self organize, providing steric separation between the magnetite nanoparticles and resulting in improved redispersion of the magnetic fluid. These hydrogen bonded assemblies are preferred with solvent or carrier fluid is non-polar.

Surface treatment of particles can help to stabilize the magnetic fluid. Agglomeration of magnetizable particles can result from the attractive van der Waals forces which result when the particles approach on another. For a suspension of solid particles in a liquid there is very high surface energy because of the presence of individual particles, which have high surface area. Therefore, processes accompanied by decreasing surface energy, such as aggregation of particles, easily occur in this system. To prevent agglomeration, and hence stabilize the MR fluid, the magnetizable particles can be stabilized through forces of repulsion. Supramolecular polymer gels can provide polymeric stabilization including steric and depletion stabilization. Steric stabilization is achieved by polymer molecules adsorbing or attaching to the surface of magnetizable particles. In a sterically stabilized system, each particle is coated with physically or chemically adsorbed surface layers that hinder the particles approach to each other to distances where van der Waals force dominate. The thickness of the adsorbed layer is determined by the length of the polymer chain. The long polymer chains in solution assume numerous configurations, which results in repulsion between particles. Depletion stabilization is due to the work involved in driving polymer molecules in free solution from the interparticle region. Close approach of iron particles is accompanied by mixing of the polymer molecules and the solvent in the interparticle regions and driving the polymer molecules out these interparticle regions. Work must be done to make the polymer molecules leave the interparticle region and this corresponds to repulsion force between particles.

A variety of additives, including anti-oxidants, anti-wear agents, corrosion inhibitors, lubricants, dispersants, viscosity modifiers, wetting agents, pH shifters, salts, pigments and dyes can be incorporated into the MRPG according to the requirements of the specific application. Table 4 lists some additives suitable for use with the present invention.

TABLE 2

Carrier Fluid Properties.

| Carrier Fluid | Formula | Density (g/ml) | Boiling point (° C.) | Melt point (° C.) | Vapor pressure (Pa) | Viscosity (cp) |
| --- | --- | --- | --- | --- | --- | --- |
| Poly-alpha-olefin (PAO) | $CH_3(CH_2)_nC_2H_3$ | 0.80 | 277 | −73 (pour pt.) | <133 75° C. | 5 |
| Silicone Oil (SO) | $(SiO(CH_3)_2)_n$ | 0.96 | >232 | −55 (pour pt.) | <675 (25° C.) | 5.1 |
| Propylene glycol | $C_3H_8O_2$ | 1.04 | 187.6 | −59 | <10 (13° C.) | 46 |
| Dioctyl Phthalate | $C_{24}H_{38}O_4$ | 0.97 | 386.9 | −50 | <10 (163.7° C.) | 56 |
| N-Dodecyl-2-Pyrrolidone | $C_{16}H_{31}NO$ | 0.95 | 361 | <−77 | <1.3 (20° C.) | 18 (20°C.) |

TABLE 3

Iron and Magnetite Particle Properties.

| | Particles | | | | |
|---|---|---|---|---|---|
| | Iron Powder S-1651 micropowder (ISP) | Iron Powder R-2430 micropowder (ISP) | Iron Powder Atomet 95 (QMP) | Nano Magnetite TMB-1510 (Nanomat) | Chemically Synthesized Ferrofluids |
| Particle Size | 3–5 micron | ~5 micron | 45–75 micron | 10–200 nm | 10–200 nm |
| Particle Density | 1.5–3.5 g/cm3 (apparent density) | 1.5–3.5 g/cm3 (apparent density) | — | — | — |
| Purity of Iron | 97% | 99.50% | — | — | — |

TABLE 4

Additives

| | Anti-oxidants | Lubricants | Dispersants | Viscosity Modifiers | Wetting Agents |
|---|---|---|---|---|---|
| Chemicals | Butylated hydroxy toluene ($C_{15}H_{24}O$) | Krytox ® Lubricants | Sodium lignin sulfonate (DARVAN ® 2) | Polymethacrylate (PMA) | DISPONIL ® O5 |
| Suppler | Aldrich | DuPont | R. T. Vanderbilt Company, Inc. | Lubrizol | Cognis Corporation |

When a Markush group or other grouping is used herein, all individual members of the group and all combinations and subcombinations possible of the group are intended to be individually included in the disclosure.

Every formulation or combination of components described or exemplified can be used to practice the invention, unless otherwise stated. Specific names of compounds are intended to be exemplary, as it is known that one of ordinary skill in the art can name the same compounds differently. When a compound is described herein such that a particular isomer or enantiomer of the compound is not specified, for example, in a formula or in a chemical name, that description is intended to include each isomers and enantiomer of the compound described individual or in any combination. One of ordinary skill in the art will appreciate that methods, starting materials, and synthetic methods, other than those specifically exemplified can be employed in the practice of the invention without resort to undue experimentation. All art-known functional equivalents, of any such methods, starting materials, and synthetic methods are intended to be included in this invention. Whenever a range is given in the specification, for example, a temperature range, a time range, or a composition range, all intermediate ranges and subranges, as well as all individual values included in the ranges given are intended to be included in the disclosure.

As used herein, "comprising" is synonymous with "including," "containing," or "characterized by," and is inclusive or open-ended and does not exclude additional, unrecited elements or method steps. As used herein, "consisting of" excludes any element, step, or ingredient not specified in the claim element. As used herein, "consisting essentially of" does not exclude materials or steps that do not materially affect the basic and novel characteristics of the claim. Any recitation herein of the term "comprising", particularly in a description of components of a composition or in a description of elements of a device, is understood to encompass those compositions and methods consisting essentially of and consisting of the recited components or elements. The invention illustratively described herein suitably may be practiced in the absence of any element or elements, limitation or limitations which is not specifically disclosed herein.

The terms and expressions which have been employed are used as terms of description and not of limitation, and there is no intention in the use of such terms and expressions of excluding any equivalents of the features shown and described or portions thereof, but it is recognized that various modifications are possible within the scope of the invention claimed. Thus, it should be understood that although the present invention has been specifically disclosed by preferred embodiments and optional features, modification and variation of the concepts herein disclosed may be resorted to by those skilled in the art, and that such modifications and variations are considered to be within the scope of this invention as defined by the appended claims.

All references cited herein are incorporated by reference to the extent not inconsistent with the disclosure herein.

EXAMPLES

Example 1

Preparation of Zn Coordinated Terpyridine Polymer SMPG MRF

The SMPGs include: carbonyl iron particles, carrier fluid, supramolecular polymer and additives. Carbonyl iron particles (ISP Technologies Inc., Wayne, N.J., Grade-R-2430) are 99.5% pure iron and are formed by thermal decomposition of iron pentacarbonyl $Fe(CO)_5$. The average diameter of the ferrous particles is about 5 microns. Each sample contains 81 wt % carbonyl iron particles. The carrier fluid is organic polar solvent typically chosen based on its viscosity, freezing and boiling points and vapor pressure. The solvent used is N-octyl-pyrrolidone (Aldrich Chemical Company, Inc.), which has a boiling point of 306° C., viscosity of 9 cp at 20° C. and a vapor pressure of less than 1.3 Pa at 20° C. Colloidal graphite (SLA1614 and SLA 1275, Acheson Colloids Company) are the additives used to improve particle stability. The supramolecular polymer is the network of Zn coordinated terpyridine polymer formed by metal-induced self-assembly.

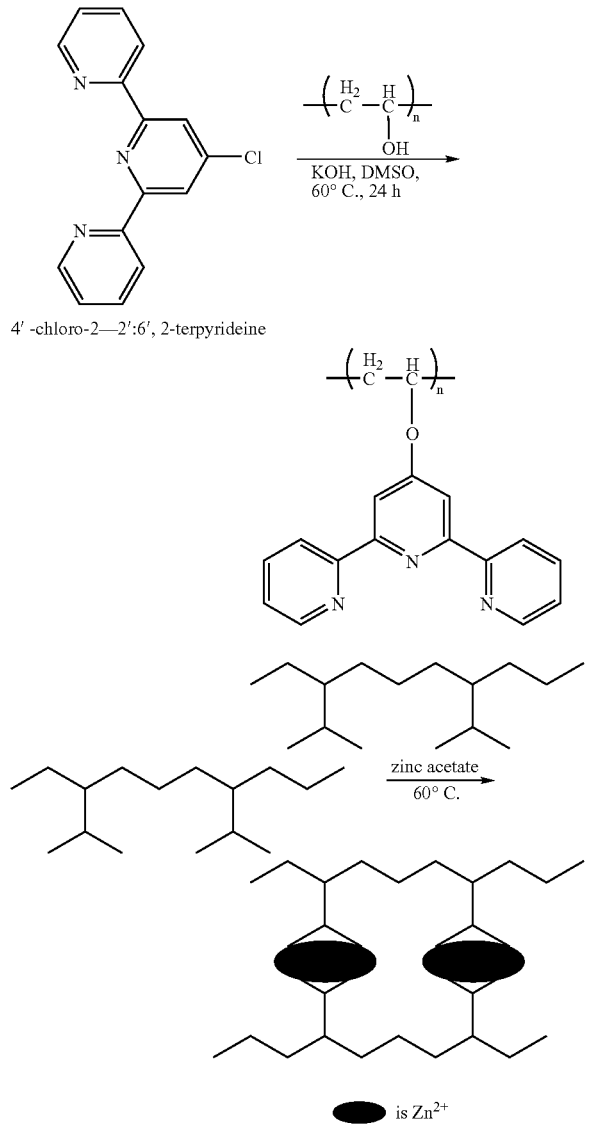

The synthesis of the desired metal-ligand supramolecular polymer is carried out in two steps. In the first step, the polymer with the side terpyridine functional group is synthesized and then the supramolecular network is formed by addition of zinc acetate. Scheme 1 describes the synthesis procedure. Polyvinyl alcohol (0.57 g 0.19 mmol, molecular weight—3000 and 13 mmol OH functional group) is added to the suspension of KOH (0.5 g, 8.93 mmol) in DMSO (20 ml). After stirring for 1 hour at 60° C., 4'-chloro-2,2':6'2"-terpyridine (0.5 g 1.9 mmol) is added. The mixture reacts at 60° C. for 24 hours and is then removed from the heater, and poured into cold distilled water. The suspension is extracted with chloroform. The organic mixture is dried and the solvent removed under vacuum. The residue is dissolved in methanol and after evaporation of the methanol the white solid (0.86 g) polymer with side terpyridine group is obtained.

To a solution of synthesized polymer in methanol, a solution of zinc acetate, which has an equivalent molar number as 4'-chloro-2,2':6'2"-terpyridine, in methanol is added dropwise at 60° C. The color changes immediately to yellow. Increasing the concentration of the metal ions, the viscosity of the solution increases. This solution is added to the carrier fluid N-octyl-pyrrolidone. The solution is heated to 70° C. to evaporate the methanol and keep the concentration of the solution at 5%. The supramolecular polymer gel is obtained. This system contains supramolecular polymer based on non-stoichiometric ratios of reactants including polyvinyl alcohol and 4'-chloro-2,2':6'2"-terpyridine. The crosslink ratio of supramolecular network depends on the ratio between the hydroxyl group from polyvinyl alcohol and the terpyridine group. UV-vis spectroscopy can be used to investigate metal—ligand complex formation.

Synthesis of SMPGs 81 weight % carbonyl iron particles are added to the supramolecular polymer gel and mixed at low shear rate (400 rpm) using a Servo dyne Mixer (model 50003-30, Cole Parmer Instrument Company) for 30 minutes. The additives are stirred thoroughly at 1200 rpm for 24 hours at room temperature. Table 5 lists the components of two SMPGs with different supramolecular polymer weight ratio. Colloidal graphite (SLA1275, Acheson Colloids Company, Port Huron, Mich.) is an extremely stable suspension of uniform particles in highly refined petroleum oil. It is formulated to reduce friction and wear while preventing metal to metal contact and surface abrasion.

TABLE 5

SMPG components

| component | Sample 1 | Sample 2 |
|---|---|---|
| Iron particles (99.5% purity) | 81% | 81% |
| Carrier fluid (N-octyl-pyrilidone) | 17.7% | 16.8% |
| Supramolecular polymer (metal induced complex network) | 0.9% | 1.8% |
| Colloidal graphite (SLA 1275) | 0.4% | 0.4% |

Example 2

Preparation of Supramolecular Poly(NIPAAm) Based on Electrostatic Interactions

Another supramolecular polymer system involves supramolecular poly(NIPAAm) with electrostatic interactions. Polyampholyte gels, containing both cationic and anionic groups on the polymer chain, have been synthesized. Two types of poly(NIPAAm) lattices were synthesized, one copolymerized with anionic monomer sodium methacrylate (NaMA) yielding the anionic poly(NIPAAm), and the other copolymerized with the cationic monomer methyl acrylamido propyl trimethyl ammonium chloride (MAPTAC) yielding cationic poly(NIPAAm). 2,2'-azobis(2-methylpropionamidine) dihydrochloride was used as the cationic initiator and ammonium persulfate was used as the anionic initiator. Supramolecular structure has been achieved through electrostatic interactions of a slightly crosslinked anionic copolymer network with a slightly crosslinked cationic copolymer network. In accordance with the present invention, interaction of linear cationic copolymer chains with linear anionic copolymer chains can be achieved within the surfactant bilayer by following the same approach described for PS-b-4VP and hydrophobically modified poly (NIPAAm).

The supramolecular interaction of the anionic and cationic copolymer networks can occur in polar solvents such as water. Once the gel is formed, the gel can be combined with magnetizable particles to form a magnetorheological fluid.

Example 3

Rheological Measurements for Zn Coordinated Terpyridine Polymer SMPG MRF

FIG. 1 shows off-state apparent viscosity as a function of shear rate at room temperature for two magnetorheological materials containing supramolecular polymer gel (samples 1 and 2 from Example 1), and a commercial magnetorheological fluid (Lord MRF 132-AD, Lord Corporation, Indianapolis, Ind.). A gel (no magnetizable particles) was also tested and remained Newtonian in this range of shear rates. This is because the presence of solvent reduces the number of chain entanglement per unit volume. (Rakesh K. Gupta. *Polymer and Composite Rheology*, New York, 1977, Chap. 10) The viscosity of the gel was about 36 cp. When iron particles are added the material demonstrates non-Newtonian behavior and higher viscosity. One of the explanations proposed by Frankel and Acrivos is that the increase in viscosity due to particulate addition is due to energy dissipation in the thin liquid film between neighboring spheres as they move past each other. (Rakesh K. Gupta. *Polymer and Composite Rheology*, New York, 1977, Chap. 10) The viscosity also increases with the amount of supramolecular polymer in the solvent.

Figure 2:
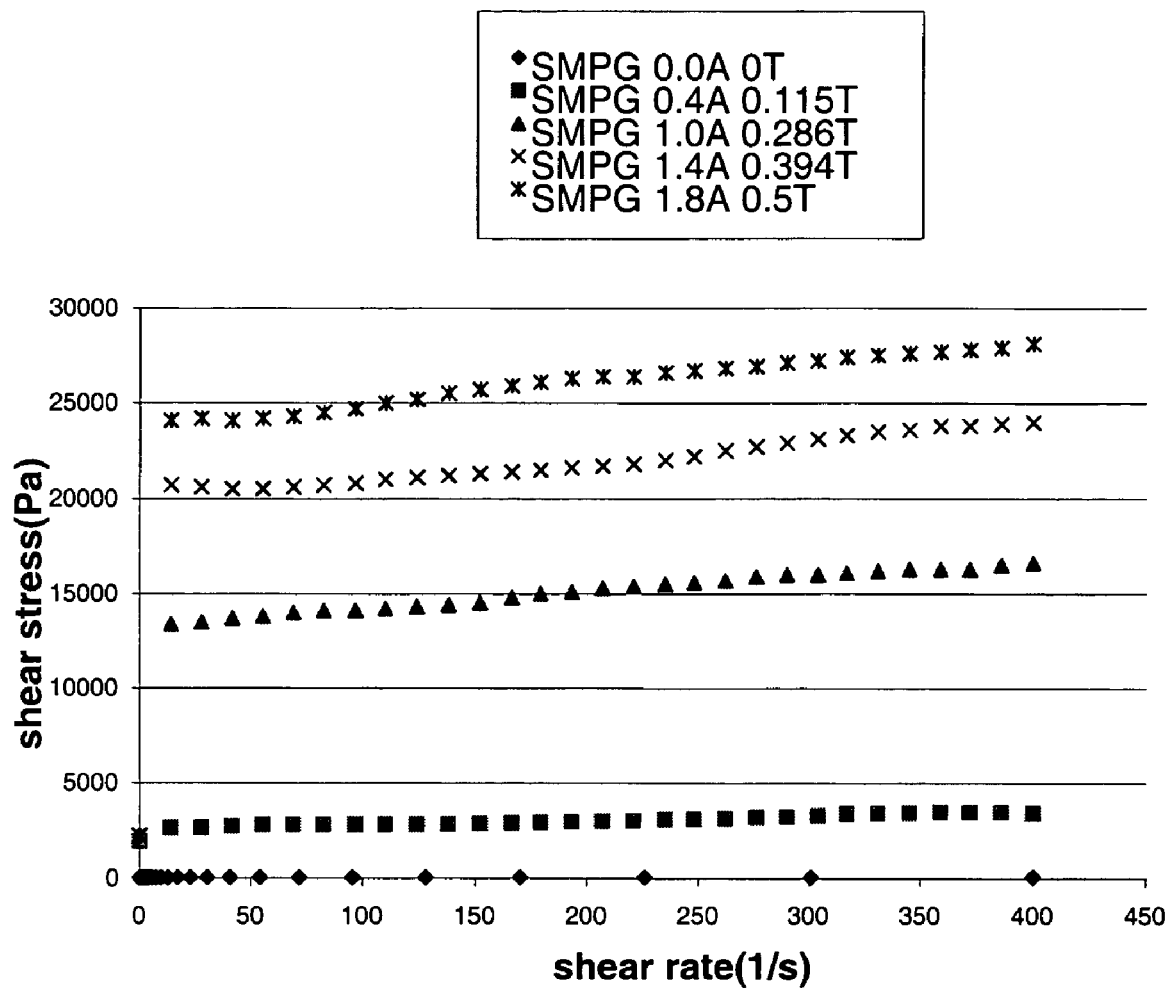
FIG. 2 shows dynamic shear stress versus shear strain rate under different applied magnetic field strengths for a magnetorheological material containing supramolecular polymer gel.

The effect of applied magnetic field on shear yield stress of the SMPG is investigated using an Anton Paar Physica MER300 rheometer, operating in either stress or strain controllable mode. ( ) The results of the shear stress vs strain rate under different applied magnetic flux densities for the MRPG are shown in FIG. 2 (for sample 2). It can be seen that dynamic shear stress is almost a linear function of shear strain rate, which can be expressed by Bingham equation. The dynamic shear yield stress can be obtained by extrapolating shear stress data back to a zero strain rate. The plastic viscosity is the slope of the curve. From FIG. 2, the shear stress increases dramatically with the applied magnetic flux density, while the plastic viscosities are not significantly affected. For example, at low magnetic flux density of 115 mT, the dynamic yield shear stress is about 2400 Pa while it is 23500 Pa under 500 mT. The yield stress increases about 9 times when magnetic field strength increases 3.7 times from 115 mT to 500 mT.

The storage modulus G' is a measure of the deformation energy stored in the sample during the shear process. After the load is removed, this energy becomes available and acts as a driving force for reformation. The loss modulus, G", is a measure of the deformation energy used up in the sample during the shear process. The energy may be used up during the process of charging the sample's structure or dissipated into the surrounding environment in the form of heat.

Figure 3:
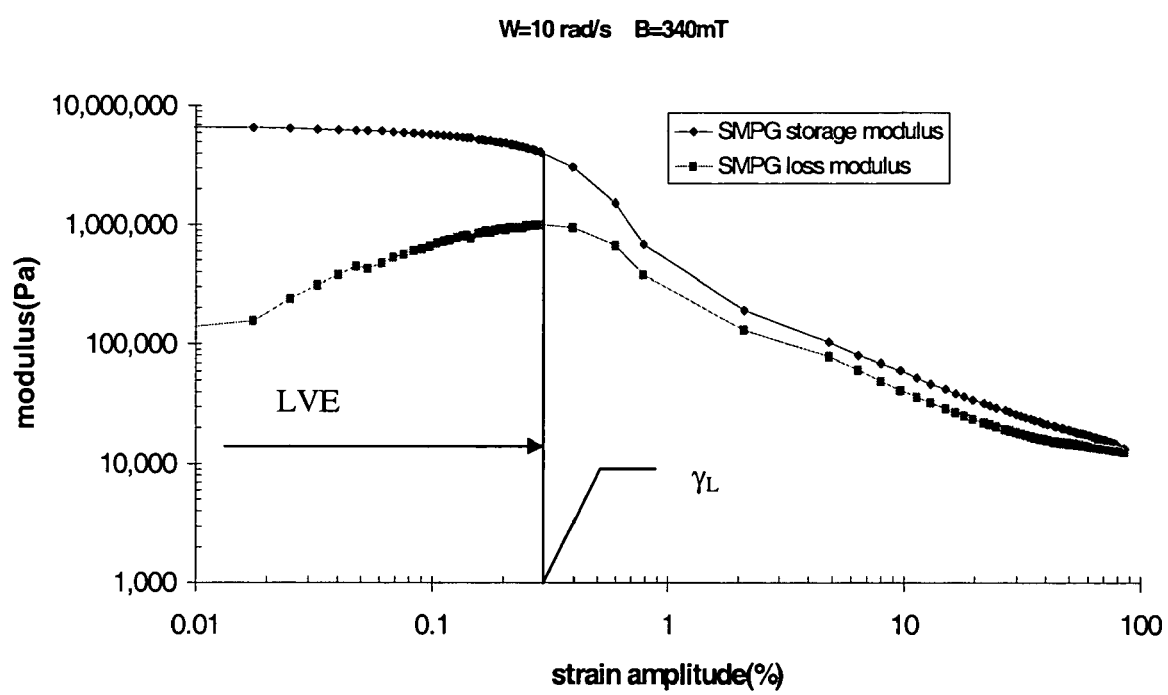
FIG. 3 shows the storage modules G' and loss modulus G" for a supramolecular polymer gel fluid as a function of strain amplitude $\gamma_o$ at B—340 mT, T=20° C., w=10 rad/s.

FIG. 3 shows the storage modulus and loss modulus as a function of strain amplitude for sample #2 at B=340 mT, and T=20° C. which is carried out with the strain amplitude from 0.01% to 100% at a fixed frequency w=10 rad/s. The range of LVE can be determined from the G' curve according to the condition that in the range of LVE G' is almost a constant. As shown in FIG. 3, two typical regions are separated by the critical strain amplitude value $\gamma_L$=0.30%. At very small strain amplitudes, less than $\gamma_L$, the storage modulus of SMPG is non-sensitive to the strain amplitude. Another region larger than $\gamma_L$ is called the nonlinear viscoelastic region. In this nonlinear region the storage modulus decreases significantly with increasing strain amplitude. A MR fluid exhibits linear viscoelastic behavior when it is in the pre-yield strain region. Hence, we can deduce that yield strain $\gamma_Y$ should be equal to $\gamma_L$ for MR fluid.

In FIG. 3, in the LVE range, the elastic behavior of SMPG dominates over the viscous behavior; the structure shows certain rigidity because G' is much higher than G". The material behaves like a viscoelastic solid. This is not a surprise because in pre-yield range the induced iron chains or columns formed by the external magnetic field have high stiffness. In the non-linear range, the value of G' is just slightly higher than G", thus, the viscous property increases significantly compared to the LVE region. The chain or column structures have been irreversibly changed. The material behavior is between the elastic solid and viscous liquid.

Both the storage and loss modulus were found to increase significantly with an increase in the applied magnetic field strength.

In an experiment, the applied strain amplitude was fixed at 0.05% and the oscillators driving frequency is swept from 1 to 100 rad/s with the applied magnetic flux density at 340 mT.

The storage modulus was independent of frequency while the loss modulus exhibited a slight decrease with frequency. The storage modulus was much higher than the loss modulus within the frequency range. Obviously, the SMPG exhibited predominantly an elastic response in the frequency range from 1 to 100 rad/s.

In another experiment, a constant strain amplitude 5% much larger than $\gamma_L$ was applied and the driving frequency was swept from 1 to 1000 rad/s.

At low frequency, less than $w_p$, the storage modulus remained constant until a plateau frequency is reached. At that point, the storage modulus begins to decrease with increasing frequency until it reaches a minimum value at frequency $w_m$. Further increasing the frequency leads to an increase in the storage modulus. The loss modulus did not have exhibit much variation in the range of the test frequency.

Example 4

Particle Settling

Figure 4:
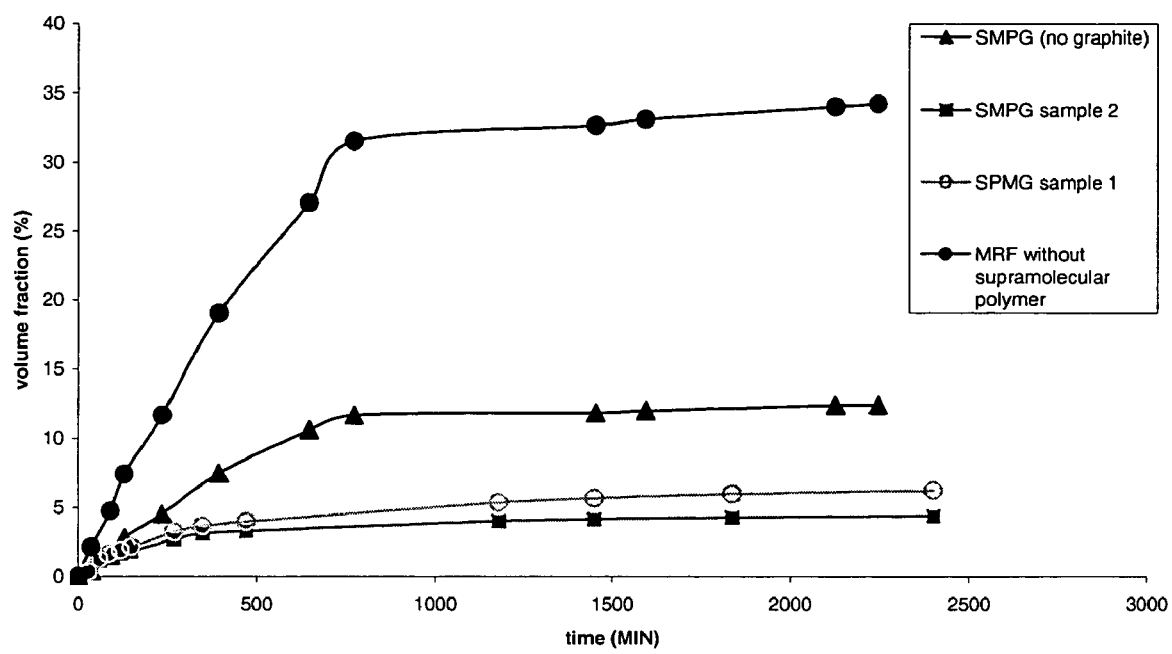
FIG. 4 compares the settling curve of various supramolecular polymer gel magnetorheological fluids and one magnetorheological fluid without supramolecular polymer.

FIG. 4 shows settling behavior of various SMPGs compared with MRF without supramolecular polymer. In this figure, a larger volume fraction indicates greater settling. It can be seen that MR fluid (sample a) which just includes carrier fluid and iron particles (without supramolecular polymer) has the greatest settling rate. Upon addition of supramolecular polymer (sample b: 1% supramolecular polymer without colloidal graphite), the settling rate decreases dramatically. Without wishing to be bound by any particular belief, one possible explanation for this behavior is that the formation of a supramolecular network, which can exist on the surface of the iron particles and in the space between the iron particles. Supramolecular network formation can provide steric stabilization and is achieved by polymer molecules adsorbing or attaching to the surface of magnetic particles, and depletion stabilization, which is due to the molecules in free solution preventing settling of the iron particles. Comparing the curves of sample b and c, it is found that colloidal graphite can also reduce the settling of iron particles. There may be two reasons for this behavior: one is the increased viscosity which the colloidal graphite causes. The other reason is that the graphite particles reduce agglomeration. It can be seen that increasing of the supramolecular polymer can also reduce the settling behavior by comparing settling curves c and d.

Figure 5:
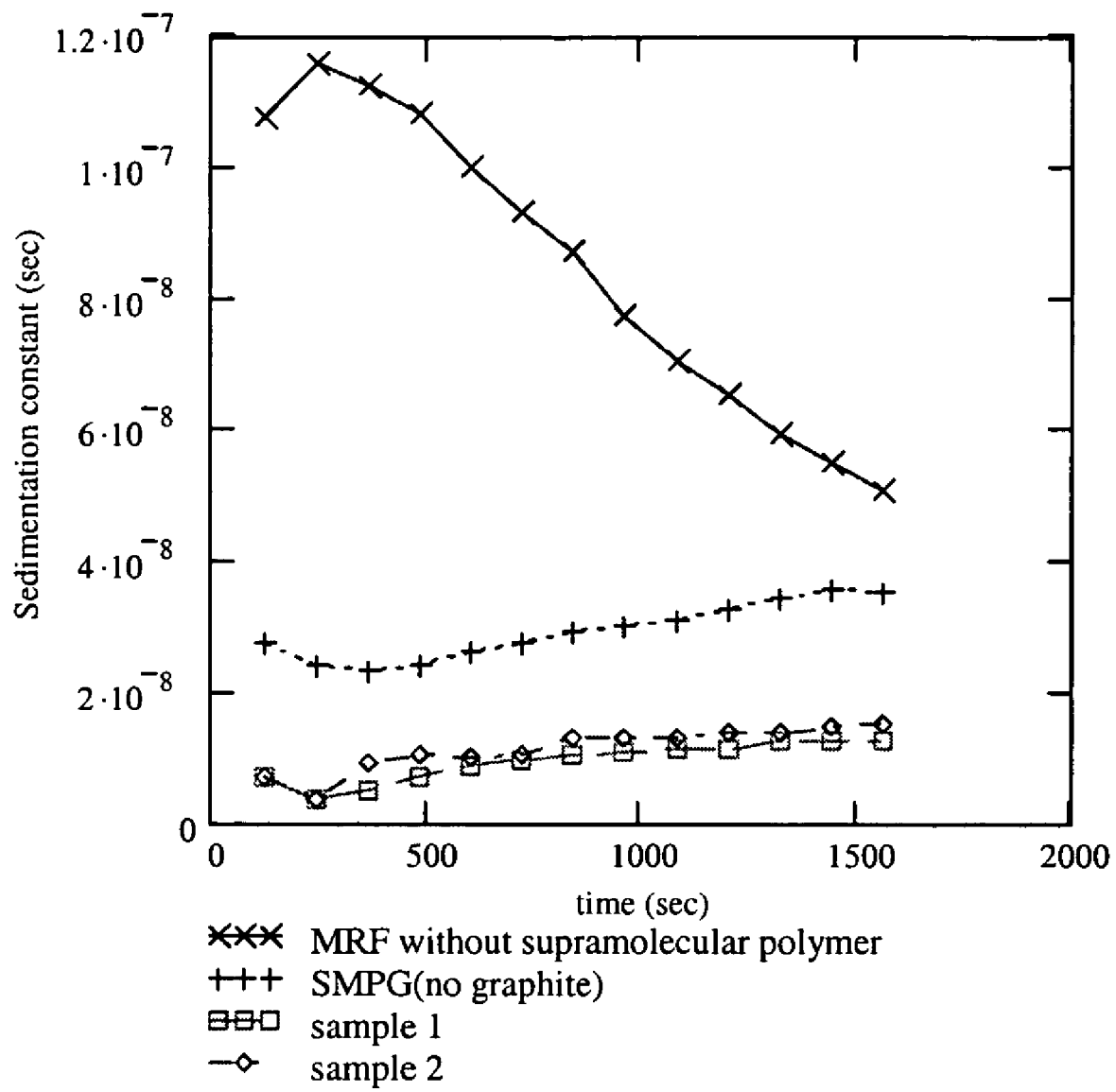
FIG. 5 compares the settling velocity of various supramolecular polymer gel magnetorheological fluids and one magnetorheological fluid without supramolecular polymer.

FIG. 5 shows the settling velocity curves for SMPGs and MRF without supramolecular polymer by measuring the inductance of the fluid. This result is consistent with the measurement shown in FIG. 4. The MRF without supramolecular polymer has the greatest sedimentation velocity and SMPG without additives have the second greatest settling velocity. Sample 2 (1.8% supramolecular polymer, 0.4% colloidal graphite) has the smallest sedimentation velocity. Actually, the curves in FIG. 5 correspond to the slope of the corresponding curves of FIG. 4 because the curves in FIG. 4 characterize the position of iron particles changing with time, so the slope of these curves indicates the settling velocity of iron particles while the average velocity of settling is shown in FIG. 5. Consequently, these two methods demonstrate good consistency.

Example 5

Dispersion of SMPG Materials

Figure 6:
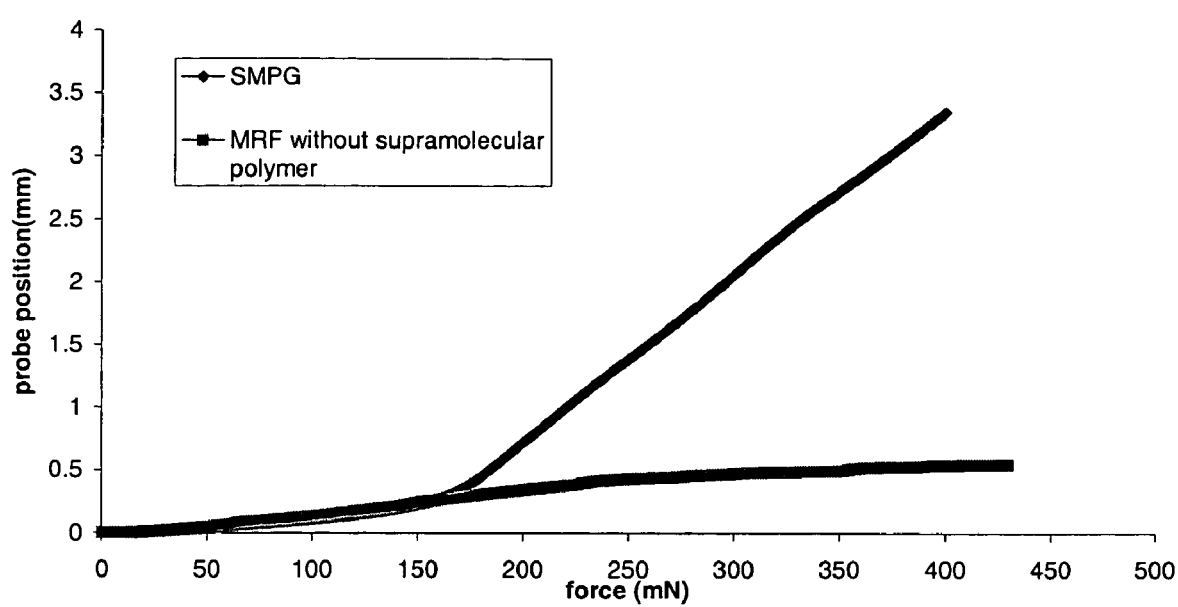
FIG. 6 compares the redispersion properties of a supramolecular polymer gel magnetorheological fluid and magnetorheological fluid without supramolecular polymer.

Probe displacement for an applied force is used as the measure of redispersibility (FIG. 6). In order to investigate how the supramolecular polymer affects the redispersibility, the behavior of a MRF sample only containing solvent (N-octyl-pyrrolidone) and iron particles with the weight ratio of 19:81 is also shown. The SMPG sample contains 1% supramolecular polymer without additives. FIG. 6 shows that the probe displacement for the MRF has lower values than that of SMPG sample, which means that the hardness of the settled iron particle cake for MRF is higher than SMPG, thus, it is easier to remix the SMPG than MR fluid.

Without wishing to be bound by any particular belief, the improved dispersion of SMPG MR materials is believed to be due at least in part to adsorption of the supramolecular polymer units on particles as well as in fluid.

Example 6

Supramolecular Polymer—Surfactant Coating of Magnetizable Particles

This technique utilizes a self-assembled surfactant bilayer on a magnetite surface to absorb monomer molecules into the bilayer. Tail to tail assembly of surfactant molecules with the hydrophilic heads of the second layer of surfactant extending toward the aqueous solution forms the bilayer structure. The concentration of the surfactant in solution is kept less than the critical micelle concentration to prevent micelle emulsion polymerization within the solution. The method involves poly(styrene-4 vinyl pyridine, PS-4VP) and a cationic surfactant; cetylpyridinium chloride (CPC) as constituents of complex magnetic fluids. Since the magnetite surface charge at high pH (alkaline medium) is negative, cationic surfactant is preferred to maximize the number of surfactant molecules adsorbed on the solid surface. A surfactant bilayer can also be formed with an anionic surfactant, such as sodium dodecyl sulfate (SDS), by adjusting the pH level.

There were two major steps in synthesizing the ferrofluid. The first was to make the magnetizable nanoparticles, 10-200 nm in size and the second step was the dispersion of those particles in carrier liquid by introducing surfactant and polymer complexation. Thus a colloidal suspension is created.

Magnetite ferrofluid was prepared by co-precipitating iron (II) and iron (III) chloride salts in the presence of a strong base; ammonium hydroxide. The salts, ferrous and ferric chloride were obtained from Fisher Scientific Corporation. A 1 M ferric chloride in 2 M HCl solution (30 ml) and 2 M ferrous chloride in 2 M HCl solution (10 ml) were placed in 100 ml flask equipped with a stirrer. Salts were prepared in acidic medium to prevent formation of iron hydroxides. At room temperature 50 ml of aqueous ammonium solution was added drop wise over a period of 5 minutes. First a brown precipitate and then a black precipitate was formed and settled. The clear liquid above the precipitated magnetite particles was poured off and the cationic surfactant, CPC, below the critical micelle concentration was added to the ferrofluid. The magnetite-surfactant mixture was allowed to remain at equilibrium for an hour to be sure of surfactant bilayer formation.

The monomer solution was then added to the ferrofluid and diffuses into the bilayer. Once the monomer molecules become concentrated within the bilayer, polymerization is initiated by ammonium persulfate (Zaxis Inc.). The ferrofluid-surfactant-monomer mixture was placed in a 1 L, four necked flask equipped with a stirrer, a thermometer, a condenser, and $N_2$ inlet. The mixture was stirred at 40° C. under $N_2$ for 30 minutes to make sure that there was no air in the system. To start the polymerization, initiator was added and the reaction was allowed to proceed for 4 hours under $N_2$. The bilayer localizes the free-radical co-polymerization reaction of styrene and 4-vinyl pyridine, resulting in a thin polymeric film surrounding the magnetite nanoparticles. This creates a net repulsion between the magnetite particles, providing steric stabilization.

Figure 7:
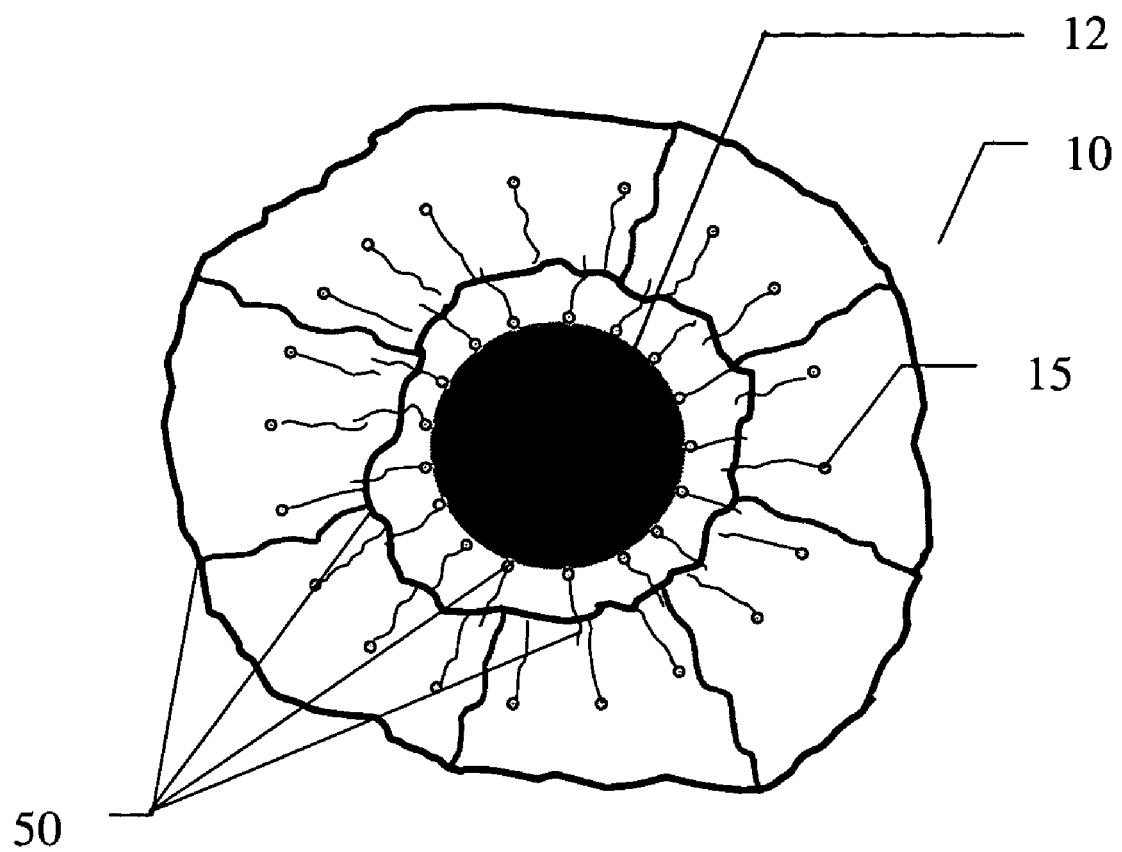
FIG. 7 schematically illustrates a supramolecular surfactant-polymer coating on a magnetizable particle.

The redispersion properties of these magnetizable fluids can be further improved by addition of a second amphiphile. After treating the magnetizable particles with the first amphiphile followed by emulsion polymerization as described above, the second amphiphile, such as 3-n pentadecylphenol (PDP), can be hydrogen bonded to the P4VP block. In this way a supramolecular polymer is constructed. Such hydrogen bonded supramolecules self organize, providing steric separation between the magnetite nanoparticles and resulting in improved redispersion of the magnetic fluid. A schematic representation of this approach is shown in FIG. 7.

An aqueous nanostructured MRPG is prepared by starting with an aqueous suspension 10 of magnetite or ferrofluid (10-15 wt. %) and micron-sized iron particles 12 (50-90 wt. %) which are the reduced form of iron pentacarbonyl. Surfactant 15 such as alkyl sulfate is dissolved in the aqueous solution and self assembles as a bilayer on the surface of the particles. Styrene and 4-vinyl pyridine (4VP) monomers are dissolved in the aqueous suspension and diffuse into the surfactant bilayer. A free radical copolymerization is done in the bilayer to form a polymeric coating around the particles. 3-n-pentadecylphenol (PDP) is hydrogen bonded to the P4VP block in order to provide the supramolecular structure 50. The supramolecular structure provides steric separation between the particles and therefore provides excellent remixing properties to the fluid.

Example 7

Supramolecular Poly(N-isopropylacrylamide)—Bilayer Surfactant Coating of Magnetite Nanoparticles Supramolecular poly(N-isopropylacrylamide) (poly (NIPAAm)) films are synthesized based on hydrophobic/hydrophilic interaction with the surfactant bilayer. Hydrophobically modified poly(NIPAAm) are used for this process. Amphiphilic copolymer of N-isopropylacrylamide and n-alkylacrylamide, such as poly(NIPAAm-N-(n-octadecyl) acrylamide), can be prepared by free radical polymerization in the surfactant bilayer. The hydrophobic/hydrophilic interactions within the surfactant template results in a self-organized structure, providing steric separation and preventing magnetizable particles from agglomeration due to attraction forces between the nanoparticles. The highly hydrophobic block of amphiphilic copolymer adsorbs in the central region, and the hydrophilic block tails remain in the aqueous solvent, leading to microphase separation. Magnetite stabilization by steric repulsive forces is then achieved using supramolecular hydrophobically modified poly (NIPAAm).

We claim:

1. A magnetorheological material comprising:
   a) a carrier material comprising a carrier fluid and a supramolecular polymer gel; and
   b) magnetizable particles
   wherein the supramolecular polymer gel comprises crosslinks formed by metal coordination, hydrophobic-hydrophilic interactions, π-π stacking, and van der Waals forces and combinations thereof.

2. A magnetorheological material comprising:
   a) a carrier material comprising a carrier fluid and a supramolecular polymer gel; and
   b) magnetizable particles
   wherein the polymer gel comprises metal coordination crosslinks.

3. The magnetorheological material of claim 2, wherein the polymer gel comprises bipyridal or terpyridal ligands.

4. The magnetorheological material of claim 3 wherein the supramolecular polymer gel comprises a network of Zn coordinated terpyridine polymer.

5. A magnetorheological material comprising:
   a) a carrier material comprising a carrier fluid and a supramolecular polymer gel; and
   b) magnetizable particles
      wherein the supramolecular polymer gel comprises crosslinks formed by metal coordination, hydrophobic-hydrophilic interactions, π-π stacking, donor-acceptor interactions, and van der Waals forces and combinations thereof and the magnetizable particles are coated with graphite or a ceramic.

6. A magnetorheological material comprising:
   a) a carrier material comprising a carrier fluid and a supramolecular polymer gel; and
   b) magnetizable particles
      wherein the supramolecular polymer gel comprises crosslinks formed by metal coordination, hydrophobic-hydrophilic interactions, π-π stacking, donor-acceptor interactions, and van der Waals forces and combinations thereof and the particles are coated with a self-assembled monolayer.

7. The magnetorheological material of claim 1 wherein the magnetizable particles are between about 1 μm and about 75 μm in diameter.

8. A magnetorheological material comprising:
   a) a carrier material comprising a carrier fluid and a supramolecular polymer gel; and
   b) magnetizable particles
   wherein the polymer gel comprises crosslinked anionic copolymer networks which electrostatically interact with crosslinked cationic copolymer networks.

9. The material of claim 8, wherein the anionic copolymer network is poly(N-isopropylacrylamide) (poly (NIPAAm) copolymerized with an anionic monomer and the cationic copolymer network is poly(NIPAAM) copolymerized with a cationic monomer.

10. The magnetorheological material of claim 8 wherein the magnetizable particles are coated with graphite or a ceramic.

11. The magnetorheological material of claim 8 wherein the particles are coated with a self-assembled monolayer.

12. The magnetorheological material of claim 8 wherein the magnetizable particles are between about 1 μm and about 75 μm in diameter.

13. The magnetorheological material of claim 8 wherein the magnetizable particles are coated with a polymer.

14. A magnetorheological material comprising:
   a) a carrier material comprising a carrier fluid and a supramolecular polymer gel;
   b) a first group of magnetizable particles having a first range of diameter sizes between about 5 and about 500 nm; and
   c) a second group of magnetizable particles having a second range of diameter sizes between about 3 and about 75 microns.

15. The magnetorheological material of claim 14 wherein the carrier fluid is selected from the group consisting of: polyalphaolefin (PAO),
   silicone oil (SO), dioctylphthalate (DOP), and propylene glycol (PG), and N-dodecyl-2-pyrrolidone.

16. The magnetorheological material of claim 14 wherein the polymer gel comprises bipyridal or terpyridal ligands which coordinate with a metal ion or anionic copolymer networks of (poly (NIPAAm) copolymerized with an anionic monomer which electostatically interact with cationic copolymer networks of poly(NIPAAM) copolymerized with a cationic monomer.

17. The magnetorheological material of claim 14 wherein the first group of magnetizable particles is selected from the group consisting of: magnetite nanoparticles, iron/cobalt based nano-particles, and mixtures thereof.

18. The magnetorheological material of claim 14 wherein the second group of magnetizable particles is selected from the group consisting of: iron and alloys thereof, iron oxide, iron nitride, iron carbide, carbonyl iron, chromium dioxide, low carbon steel, silicon steel, nickel, cobalt, and mixtures thereof.

19. A method for making a magnetorheological fluid comprising:
   a) forming a supramolecular polymer gel in a solvent; and
   b) combining the supramolecular polymer gel with magnetizable particles,
   wherein the polymer gel comprises crosslinks formed by hydrophobic/hydrophilic interactions, Van der Waals interactions, π-π stacking bonds, metal coordination bonds and combinations thereof.

20. The method of claim 19, wherein the magnetizable particles are between about 5 and about 500 nm.

21. A method for making a magnetorheological fluid comprising:
   a) forming a supramolecular polymer gel in a first solvent;
   b) adding the supramolecular gel and the first solvent to a second solvent;
   c) removing the first solvent; and
   d) combining the supramolecular polymer gel and the second solvent with magnetizable particles,
   wherein the polymer gel comprises crosslinks formed by hydrophobic/hydrophilic interactions, Van der Waals interactions, π-π stacking bonds, donor-acceptor interactions, metal coordination bonds and combinations thereof.

22. The method of claim 21, wherein the supramolecular gel comprises bipyridal or terpyridal ligands which coordinate with a metal ion.

23. A method for making a magnetorheological fluid comprising:
   a) coating magnetizable particles
   b) forming a supramolecular polymer gel in a solvent;
   c) combining the supramolecular polymer gel with the coated magnetizable particles,
   wherein the polymer gel comprises crosslinks formed by hydrophobic/hydrophilic interactions, Van der Waals interactions, π-π stacking bonds, donor-acceptor interactions, metal coordination bonds and combinations thereof.

24. The method of claim 23 wherein the magnetizable particles are coated using atom transfer radical polymerization, ring opening metathesis polymerization, or dry coating.

25. A method for making a magnetorheological fluid comprising:
   a) forming a supramolecular polymer gel in a solvent; and
   b) combining the supramolecular polymer gel with magnetizable particles,
   wherein the polymer gel comprises crosslinks formed by hydrophobic/hydrophilic interactions, Van der Waals interactions, π-π stacking bonds, donor-acceptor interactions, metal coordination bonds and combinations thereof and magnetizable particles comprise a first group of magnetizable particles having a first range of diameter sizes between about 5 and about 500 nm, and a second group of magnetizable particles having a second range of diameter sizes between about 3 and about 75 microns.

26. A method for making a magnetorheological fluid comprising:
   a) forming a supramolecular polymer gel in a solvent; and
   b) combining the supramolecular polymer gel with magnetizable particles,
   wherein the supramolecular polymer gel comprises crosslinked anionic copolymer networks which electrostatically interact with crosslinked cationic copolymer networks.

27. The method of claim 26 wherein the anionic copolymer network is a poly(N-isopropylacrylamide) (poly(NIPAAm) copolymerized with an anionic monomer and the cationic copolymer network is poly(NIPAAM) copolymerized with a cationic monomer.

28. A macinetorheological material comprising:
   a) a carrier material comprising a carrier fluid and a supramolecular polymer gel; and
   b) magnetizable particles
   wherein the supramolecular polymer gel comprises crosslinks formed by metal coordination, hydrophobic-hydrophilic interactions, π-π stacking, donor-acceptor interactions, and van der Waals forces and combinations thereof and the magnetizable particles are coated with a polymer.

* * * * *